United States Patent
Doerpmund et al.

(10) Patent No.: US 9,158,599 B2
(45) Date of Patent: Oct. 13, 2015

(54) PROGRAMMING FRAMEWORK FOR APPLICATIONS

(71) Applicants: Jens Doerpmund, Palo Alto, CA (US); Jitender Aswani, Palo Alto, CA (US); Ryan Leask, Palo Alto, CA (US)

(72) Inventors: Jens Doerpmund, Palo Alto, CA (US); Jitender Aswani, Palo Alto, CA (US); Ryan Leask, Palo Alto, CA (US)

(73) Assignee: SAP SE, Walldorf (DE)

( * ) Notice: Subject to any disclaimer, the term of this patent is extended or adjusted under 35 U.S.C. 154(b) by 84 days.

(21) Appl. No.: 13/929,522

(22) Filed: Jun. 27, 2013

(65) Prior Publication Data

US 2015/0007202 A1    Jan. 1, 2015

(51) Int. Cl.
G06F 9/54 (2006.01)
G06F 17/30 (2006.01)

(52) U.S. Cl.
CPC ............ *G06F 9/54* (2013.01); *G06F 17/30864* (2013.01)

(58) Field of Classification Search
CPC .............................. G06F 17/30864; G06F 9/54
See application file for complete search history.

(56) References Cited

U.S. PATENT DOCUMENTS

| | | | |
|---|---|---|---|
| 4,783,752 A | 11/1988 | Kaplan et al. | |
| 5,345,587 A | 9/1994 | Fehskens et al. | |
| 6,236,994 B1 | 5/2001 | Swartz et al. | |
| 7,099,727 B2 | 8/2006 | Wu et al. | |
| 7,225,177 B2 | 5/2007 | Wu et al. | |
| 7,231,384 B2 | 6/2007 | Wu et al. | |
| 7,340,454 B2 | 3/2008 | Wu et al. | |
| 7,523,077 B2 | 4/2009 | Wu et al. | |
| 7,533,074 B2 | 5/2009 | Wu et al. | |
| 7,599,930 B1 * | 10/2009 | Burns et al. ........................... 1/1 |
| 7,650,609 B2 | 1/2010 | Klevenz et al. | |
| 7,657,609 B2 | 2/2010 | Klevenz et al. | |
| 7,761,320 B2 | 7/2010 | Fliess et al. | |
| 7,779,383 B2 | 8/2010 | Bornhoevd et al. | |
| 7,870,117 B1 * | 1/2011 | Rennison ...................... 707/706 |
| 7,953,744 B2 * | 5/2011 | Gharat et al. .................. 707/758 |
| 8,069,437 B2 | 11/2011 | Aigner et al. | |
| 8,090,754 B2 | 1/2012 | Schmidt et al. | |
| 8,095,431 B1 * | 1/2012 | Ahluwalia .................... 705/26.5 |
| 8,122,003 B2 | 2/2012 | Wu | |
| 8,204,905 B2 * | 6/2012 | Kuo et al. ..................... 707/780 |
| 8,311,996 B2 * | 11/2012 | Looi ............................. 707/705 |
| 8,352,478 B2 | 1/2013 | Buchmann et al. | |
| 8,387,030 B2 | 2/2013 | Brunswig et al. | |
| 8,433,715 B1 | 4/2013 | Mirhaji | |
| 8,452,755 B1 | 5/2013 | Ye et al. | |
| 8,484,208 B1 | 7/2013 | Raghavan et al. | |
| 8,527,939 B2 | 9/2013 | Elad et al. | |
| 8,554,750 B2 | 10/2013 | Rangarajan et al. | |
| 8,650,210 B1 | 2/2014 | Cheng et al. | |
| 8,843,434 B2 * | 9/2014 | Attaran Rezaei et al. ..... 707/999.002 |
| 2002/0087566 A1 | 7/2002 | McAleer, III et al. | |
| 2004/0193388 A1 | 9/2004 | Outhred et al. | |

(Continued)

FOREIGN PATENT DOCUMENTS

WO    2014089769 A1    6/2014

*Primary Examiner* — Charles E Anya

(74) *Attorney, Agent, or Firm* — Fountainhead Law Group PC

(57) ABSTRACT

An application comprises program code that includes API tags, which during execution of the application may be resolved to reference-able data objects. The data objects may be objects in a knowledge base. The API tags decouple the program code from the specific data contained in the knowledge base, allowing for applications that access the knowledge base to be written independently of the knowledge base; even before the knowledge base is loaded with data.

20 Claims, 19 Drawing Sheets

(56) References Cited

U.S. PATENT DOCUMENTS

| | | |
|---|---|---|
| 2007/0208693 A1 | 9/2007 | Chang et al. |
| 2008/0091408 A1* | 4/2008 | Roulland et al. .................. 704/9 |
| 2008/0263006 A1 | 10/2008 | Wolber et al. |
| 2008/0263007 A1 | 10/2008 | Schmidt |
| 2009/0013216 A1 | 1/2009 | Abrashkevich et al. |
| 2009/0094234 A1* | 4/2009 | Marvit et al. .................... 707/5 |
| 2009/0132345 A1* | 5/2009 | Meyssami et al. .............. 705/10 |
| 2011/0040766 A1 | 2/2011 | Robinson et al. |
| 2011/0040776 A1 | 2/2011 | Najm et al. |
| 2011/0145262 A1 | 6/2011 | Jamjoom et al. |
| 2012/0102029 A1 | 4/2012 | Larson et al. |
| 2012/0143875 A1 | 6/2012 | Sarma et al. |
| 2012/0246130 A1 | 9/2012 | Schmidt |
| 2012/0290583 A1 | 11/2012 | Mahaniok et al. |
| 2012/0331003 A1* | 12/2012 | Chu-Carroll et al. ......... 707/771 |
| 2013/0013580 A1* | 1/2013 | Geller et al. .................. 707/706 |
| 2013/0110752 A1 | 5/2013 | Robinson et al. |
| 2013/0151463 A1 | 6/2013 | Ritter et al. |
| 2013/0219333 A1 | 8/2013 | Palwe et al. |
| 2013/0275448 A1 | 10/2013 | Mirhaji |
| 2013/0297617 A1 | 11/2013 | Roy et al. |
| 2013/0298319 A1 | 11/2013 | Schlager |
| 2014/0149376 A1 | 5/2014 | Kutaragi et al. |
| 2014/0282219 A1 | 9/2014 | Haddock |
| 2014/0282356 A1 | 9/2014 | Mills et al. |
| 2014/0316890 A1 | 10/2014 | Kagan |

* cited by examiner

PROGRAMMING FRAMEWORK FOR APPLICATIONS

CROSS REFERENCE TO RELATED APPLICATIONS

This application is related to commonly-owned concurrently filed U.S. application Ser. No. 13/902,677, entitled "REPRESENTING ENTERPRISE DATA IN A KNOWLEDGE GRAPH" and U.S. application Ser. No. 13/902,686, entitled "IDENTIFYING AND INVOKING APPLICATIONS BASED ON DATA IN A KNOWLEDGE GRAPH," each of which is incorporated herein by reference in its entirety for all purposes.

BACKGROUND

Unless otherwise indicated herein, the approaches described in this section are not prior art to the claims in this application and are not admitted to be prior art by inclusion in this section.

A typical organization such as a business enterprise collects large amounts of data. Most users of the data are casual users, who may get periodic reports from their IT group or business analysis groups. Oftentimes, the data contained in the reports are old and the reports themselves may not provide the right information or analytics that a particular user may desire. Requests for specialized reports, however, typically require three to six or more months turnaround time. By the time the user gets their report, the data or the report is no longer relevant.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
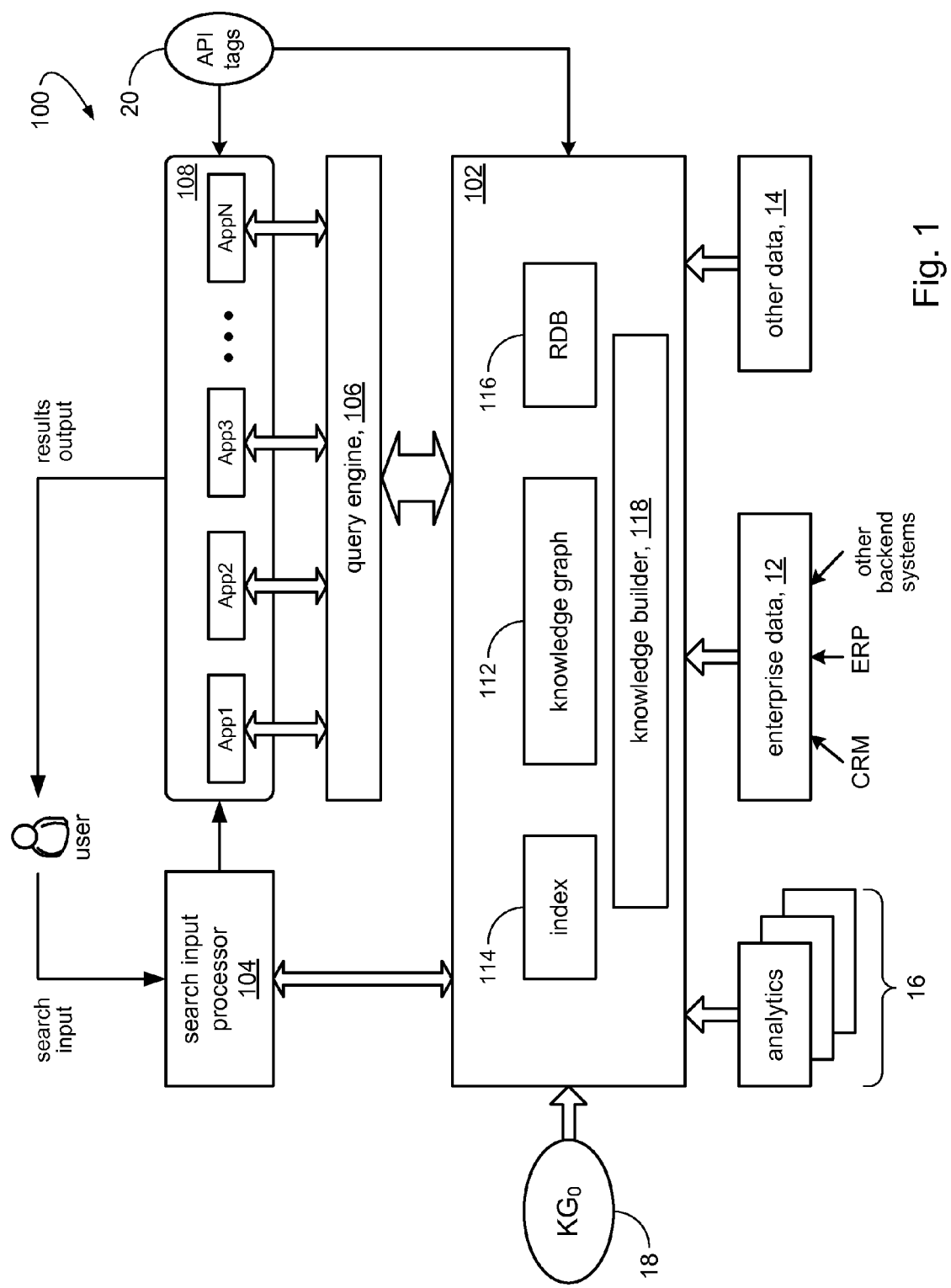
FIG. 1 represents a high level block diagram of a system in accordance with the present disclosure.

FIG. 1 shows a system 100 in an organization (e.g., a business enterprise) in accordance with embodiments of the present disclosure. The system 100 may comprise a knowledge base 102, a search input engine 104, a query engine 106, and a collection of query processing applications 108 (e.g., App1 . . . AppN).

In accordance with the present disclosure, the knowledge base 102 may comprise a knowledge graph 112, an index 114, a database system 116, and a knowledge builder 118. The knowledge base 102 may represent an organization's knowledge, as manifested in the knowledge graph 112, index 114, and database system 116. In some embodiments, the database system 116 may be a relational database (RDB), although in other embodiments, the database system may be based on other suitable database architectures. The knowledge builder 118 may receive data from the organization and incorporate that data into the knowledge base 102, thus increasing the store of the organization's knowledge.

The search input engine 104 may receive search inputs from a user. The search input engine 104 may invoke a selected application from among the collection of query processing applications 108 based on the user's search input. An application (e.g., App1) that is invoked may process the query represented in the user's search input by accessing the knowledge base 102 via the query engine 106 to produce a results output, which may then be presented to the user.

In accordance with the present disclosure, the knowledge base 102 may be connected to various sources of data in order to build up the knowledge base. In a business enterprise, for example, a source of data may be enterprise data 12. For example, the knowledge base 102 may be connected to the enterprise's backend systems to collect and store the enterprise data 12. Typical backend systems include customer relationship management (CRM), enterprise resource planning (ERP), and so on. The example of a business enterprise will be used in the remaining discussions with the understanding that organizations other than businesses may be served by the system 100 of the present disclosure.

Another source of data 14 that can be stored in the knowledge base 102 may include, for example, publicly accessible data. In some embodiments, public data may be accessed from the Internet, for example, by scouring the Internet using known "web crawling" techniques. Other data sources 14 may include, for example, public records posted on government web sites and such. These additional sources of data 14 may add further context to the enterprise data 12, provide supplemental information about the enterprise data, and so on to enhance the quality and usefulness of the enterprise data. For example, data from a CRM system typically includes information about the enterprise's customers. Crawling the Internet may reveal additional information about its customers (e.g., publicly available information from their Facebook® account, and so on) that can be read into and incorporated into the knowledge base 102.

Another source of data that can be included in the knowledge base 102 are analytics 16. Analytics data 16 may comprise data that are derived from computations and analyses performed on the data stored in the knowledge base 102. In some embodiments analytics data 16 may incorporate other data 14 as well. Analytics data 16 may be generated within the system 100. In some embodiments, for example, background processes (not shown) within the system 100 may perform computation and other analyses on the data. The results may serve an additional source of data that can be incorporated into the knowledge base 102. In other embodiments, analytics data 16 may be generated from processes or systems external to the system 100. This approach may be useful when the volume of data in the knowledge base 102 increases to a point where the computing capacity of one data system is insufficient.

In some embodiments, an initial knowledge graph 18 may be provided to the knowledge base 102, for example, when the system 100 is first installed. The initial knowledge graph 18 may represent the initial state of the knowledge graph 112, and in the context of an enterprise may represent a rudimentary view of the enterprise data. As will be explained below, the knowledge graph 112 will grow as more and more data is fed into the knowledge base 102.

Figure 2:
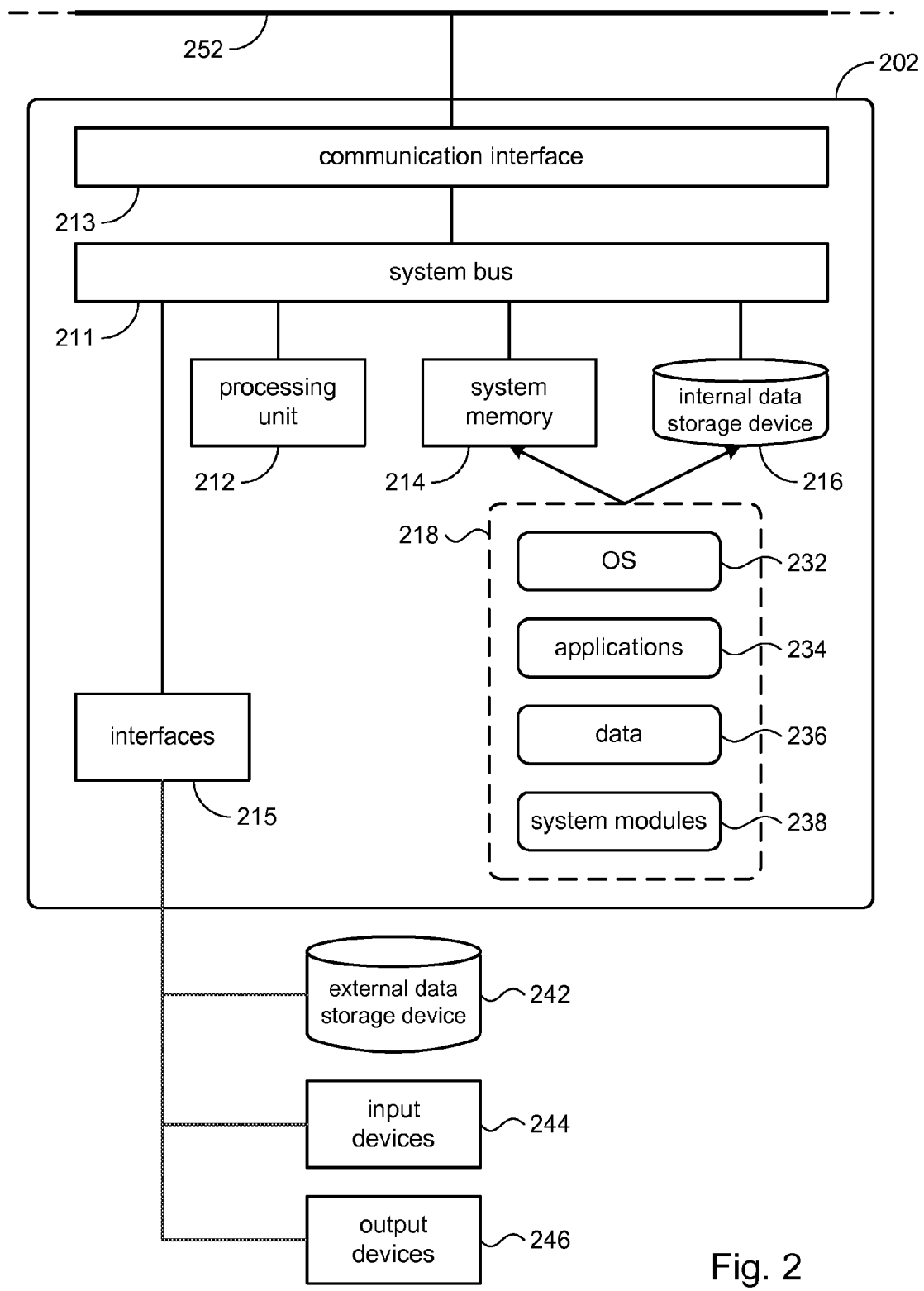
FIG. 2 illustrates an example of a hardware implementation of a system in accordance with the present disclosure.

In accordance with the present disclosure, the system 100 may be implemented using any suitable technology, for example, in the "cloud" (e.g., using the software as a service, SaaS, models and the like), in hardware that is on enterprise premises, or some combination of cloud computing and hardware. Referring to FIG. 2, an example of a hardware embodiment is shown. In an illustrative implementation, the system 100 may include a computer system 202 having a processing unit 212, a system memory 214, and a system bus 211. The system bus 211 may connect the various system components including, but not limited to, the processing unit 212, the system memory 214, an internal data storage device 216, and a communication interface 213.

The processing unit 212 may comprise a single-processor configuration, or may be a multi-processor architecture. The system memory 214 may include read-only memory (ROM) and random access memory (RAM). The internal data storage device 216 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD), and so on. The internal data storage device 216 and its non-transitory computer-readable storage media may serve as nonvolatile storage for data, data structures, computer-executable instructions, and so forth. It is noted that computer-readable storage media may include zip drives, magnetic cassettes, flash memory cards, cartridges, and the like. Any such media may contain computer-executable instructions for performing the methods disclosed herein.

The system memory 214 and/or the internal data storage device 216 may store a number of program modules, including an operating system 232, one or more application programs 234, program data 236, and other program/system modules 238. The application programs, when executed by the processing unit 212, may cause the processing unit to perform steps set forth in the present disclosure, for example, to operate one or more of the knowledge base 102 and it components, the search input engine 104, the query engine 106, and so on.

An external data storage device 242 may be connected to the computer system 202. In some embodiments, the elements of the knowledge base 102 may be implemented on the data storage device 242. In other embodiments, separate data storage systems may be deployed to store the knowledge graph 112, the index 114, and the database system 116.

Access to the computer system 202 may be provided by a suitable input device 244 (e.g., keyboard, mouse, touch pad, etc.) and a suitable output device 246, (e.g., display screen). Thus, an administrative user may access the system 100 to maintain and otherwise manage the system.

The computer system 202 may operate in a networked environment using logical connections via wired and/or wireless communications to one or more remote computers (not shown) over a communication network 252. The communication network 252 may be a local area network (LAN) and/or larger networks, such as a wide area network (WAN). The communication interface 213 may provide access to the enterprise's backend systems, the Internet, and so on. User's may access the system remotely, for example, using a web interface.

Figure 3:
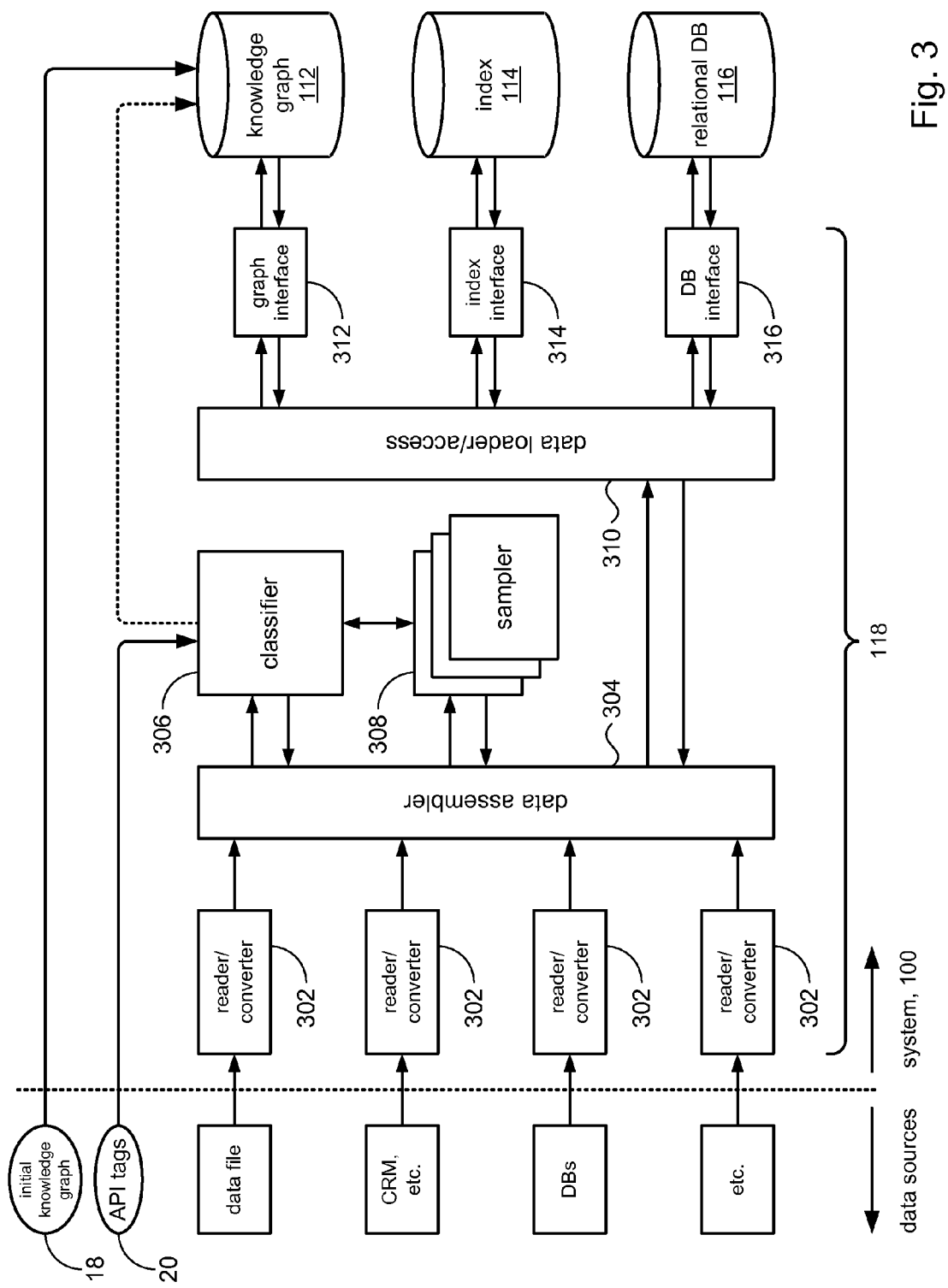
FIG. 3 illustrates a high level logical diagram of a knowledge builder in accordance with the present disclosure.

Referring now to FIG. 3, details of the knowledge builder 118 in accordance with some embodiments of the present disclosure will be discussed. As explained above, the knowledge builder 118 may receive enterprise data 12 and build or otherwise incorporate that data into the knowledge base 102. As will be explained in more detail below, the data may be incorporated into one or more of the knowledge graph 112, the index 114, and/or the database system 116.

The knowledge builder 118 may include reader/converter modules 302 for each source of data. Each reader/converter module 302 will know how to interface to its particular source of date. Data sources may include the backend systems of the enterprise (e.g., CRM), data pulled from the Internet, external databases, data files, and so on. A reader/converter module 302 for an enterprise backend system may comprise a communication interface (both hardware and software) to communicate with that backend system access and download the data stored and managed by that backend system. The reader/converter module 302 for accessing data on the Internet may comprise web crawler applications or other similar technology. And so on, with other data sources.

The data from the data sources will likely exist in several forms and formats. Accordingly, each reader/converter 302 may perform data conversion to convert data to an internal standardized format to facilitate data handling and data processing efforts downstream in the knowledge builder 118.

A data assembler 304 may receive data from the reader/converters 302. In accordance with the present disclosure, the data assembler 304 may process the data and incorporate the data into the knowledge stores of the knowledge base 102, namely the knowledge graph 112, index 114, and database system 116.

In accordance with the present disclosure, data may be classified according to classes of data defined in the knowledge graph 112. Accordingly, the data assembler 304 may provide the received data to a classifier 306 to do perform the classification of data. In some embodiments, the classifier 306 may use one or more helper modules 308 to facilitate the classification process. For example, the classifier 306 may be able to classify the data based only on a sample of the data. Accordingly, a sampler helper module 308 may be provided to take a suitable sample of the data for the classifier 306.

A data loader and access module 310 may coordinate access to the knowledge stores. The data loader and access module 310 may be responsible for adding data to the various components of the knowledge base 102. For example, the data loader and access module 310 may manage the knowledge graph 112, such as adding nodes to the graph, creating links (edges) between nodes, and so on. Similarly, the data loader and access module 310 may manage the contents of the index 114 and the database system 116.

Interfaces may be provided in order to hide the low level details of the knowledge graph 112, the index 114, and the database system 116. Accordingly, the loader and access module 310 be given access to these parts of the knowledge base 102 via interfaces 312, 314, and 316.

Figure 4:
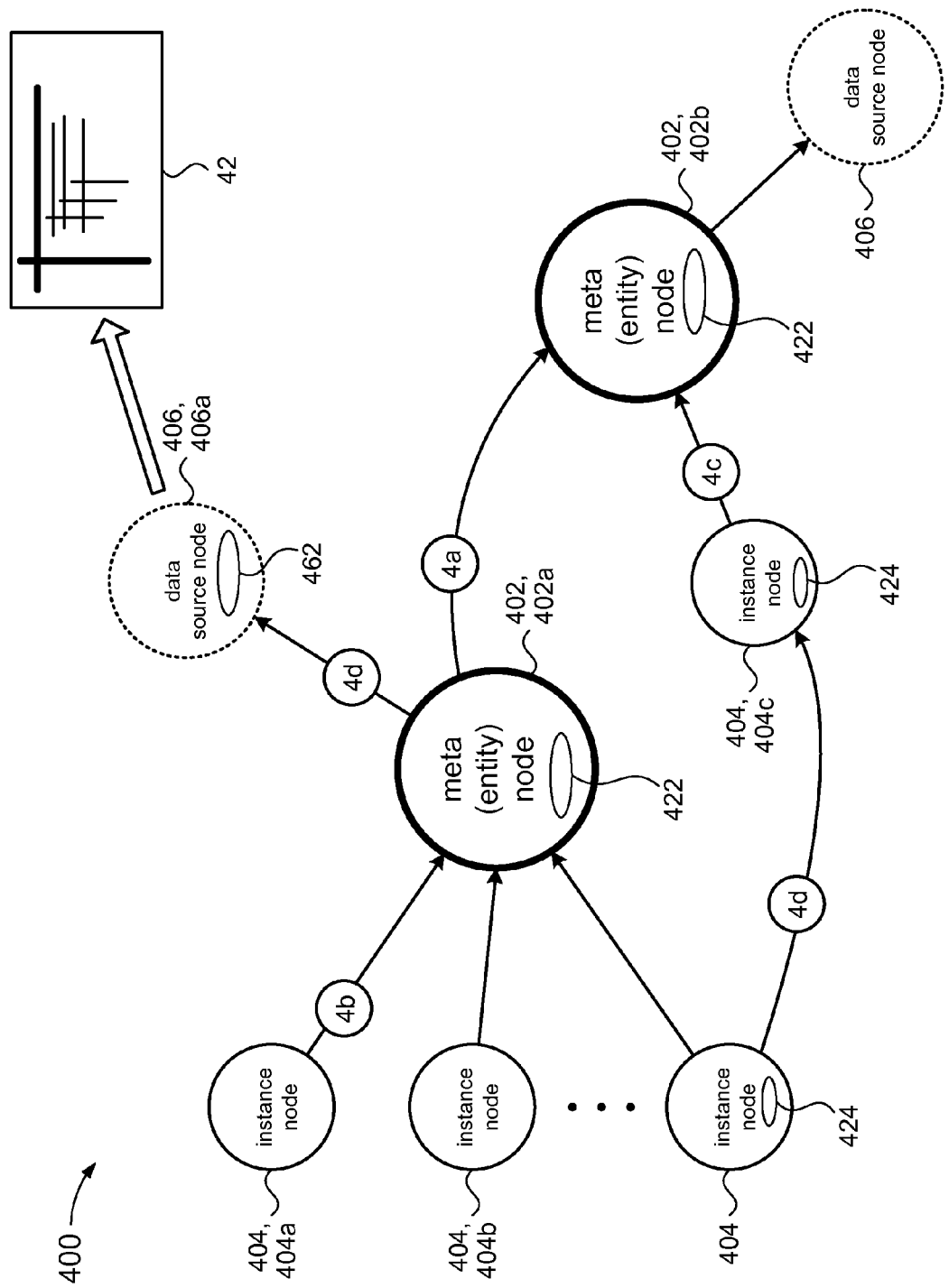
FIG. 4 illustrates aspects of a knowledge graph in accordance with the present disclosure.

The description will now turn to a discussion of knowledge graphs (e.g., knowledge graph 112) in accordance with the present disclosure. A knowledge graph represents data, and more particularly the knowledge graph represents the semantics in the data. FIG. 4 introduces some terminology used in the following discussions of knowledge graphs. A knowledge graph 400 may be viewed as a network of connected nodes. In specific embodiments, the knowledge graph 400 may be represented in a computer with structured data that represent nodes, properties and/or attributes of nodes, links (edges) between nodes, properties and/or attributes of links, and the like.

The knowledge graph 400 comprises first level nodes 402 (also referred to as meta nodes, entity nodes) that define an abstraction of the data represented by the knowledge graph. In particular, the data that is represented by the knowledge graph 400 may be classified into different classes of data. Each first level node 402 represents a class of data among the classes of data. Merely to illustrate the point, a class of data might be automobiles, which would be represented by a first level node, another class of data might be elementary schools, which would be represented by another first level node, and so on. First level nodes 402 may include a properties list 422, which specify properties/attributes (collectively "properties") of instances of data in the corresponding class. For example, properties of the class of data called automobiles may include make, model, color, and so on. The properties list 422 may also include information about the first level node itself.

Some first level nodes 402 may be related to other first level nodes. Links (e.g., link 4a) may be defined between two first level nodes 402 that have a relationship between them. For example, if there is a relation between two first level nodes 402a, 402b, then link 4a may be defined between the two nodes. The link 4a is "directed" in that the link represents the idea that node 402a "is related to" node 402b in some way. Likewise, if node 402b was related to node 402a in some way, then a directed link in the direction from node 402b to node 402a would be defined.

As mentioned above, first level nodes 402 define the properties of data that they represent, in their associated properties list 422. The first level nodes 402 do not otherwise represent instances of the data they define, and for this reason first level nodes may be referred to as "meta nodes". Instances of the data that a first level node 402 defines may be represented by second level nodes 404 (also referred to as instance nodes). Using the automobiles example above, an instance of the class of data called automobiles might be "a red Ford Mustang." Thus, while a first level node 402 may define the "properties" of the class of data called automobiles, namely make, model and color, a second level node 404 may store actual values for an instance of an automobile, for example, Ford, Mustang, Red.

Second level nodes 404 are linked to their respective first level nodes 402. For example, second level node 404a is linked 4b to first level node 402a by the relation that the second level node "is an instance of" the first level node. Likewise, second level nodes 404b and 404c are instances of first level node 402a, and second level node 404c is an instance of first level node 402b. As will be explained below, some second level nodes 404 may be linked together (e.g., link 4d) to reflect the linkage between respective first level nodes that the second level nodes are instances of.

Second level nodes 404 may include a properties list 424. The properties list 424 may store or otherwise identify the actual data values of a given instance; for example, Ford, Mustang, Red. The properties list 424 may include field names that identify what the values are, data types, and so on; in other words, the properties list 424 may include metadata that describes attributes of the actual data that correspond to the instance node 404.

In accordance with the present disclosure, the data that is represented by the knowledge graph 400 may also be stored in a separate data store 42. More particularly, each class of data may be stored in it own data store 42. The knowledge graph 400 may include data source nodes 406 that point to their respective data stores 42. Each data source node 406 may include a properties list 462 that describes the details of the data store 42, such as information on how to locate and access the data store, how the data is stored in the data store, and so on. This aspect of the present disclosure will be described in more detail below.

Each first level node 402 may have a link to a corresponding data source node 406 that points to the data store 42 which contains the class of data represented by that first level node. For example, first level node 402a may have a link 4d to data source node 406a, which in turn points to data store 42. Data store 42 may store instances of the class of data defined by the first level node.

In order to provide context for the remaining discussion of embodiments of the present disclosure, the example introduced in FIG. 1 of an enterprise and its enterprise data 12 (such as might be obtained from the enterprise's backend systems) will be used. The enterprise data 12 may include data that represents the customers of the enterprise, including information such as customer name, address, and so on. The enterprise data 12 may further include data about its products, including information such as product identifiers, pricing, and the like. Data about the enterprise's sales orders may include information such as who (i.e., customer) purchased what (i.e., product), and related information such as when the purchase was made, how many units, and so on.

Figure 5:
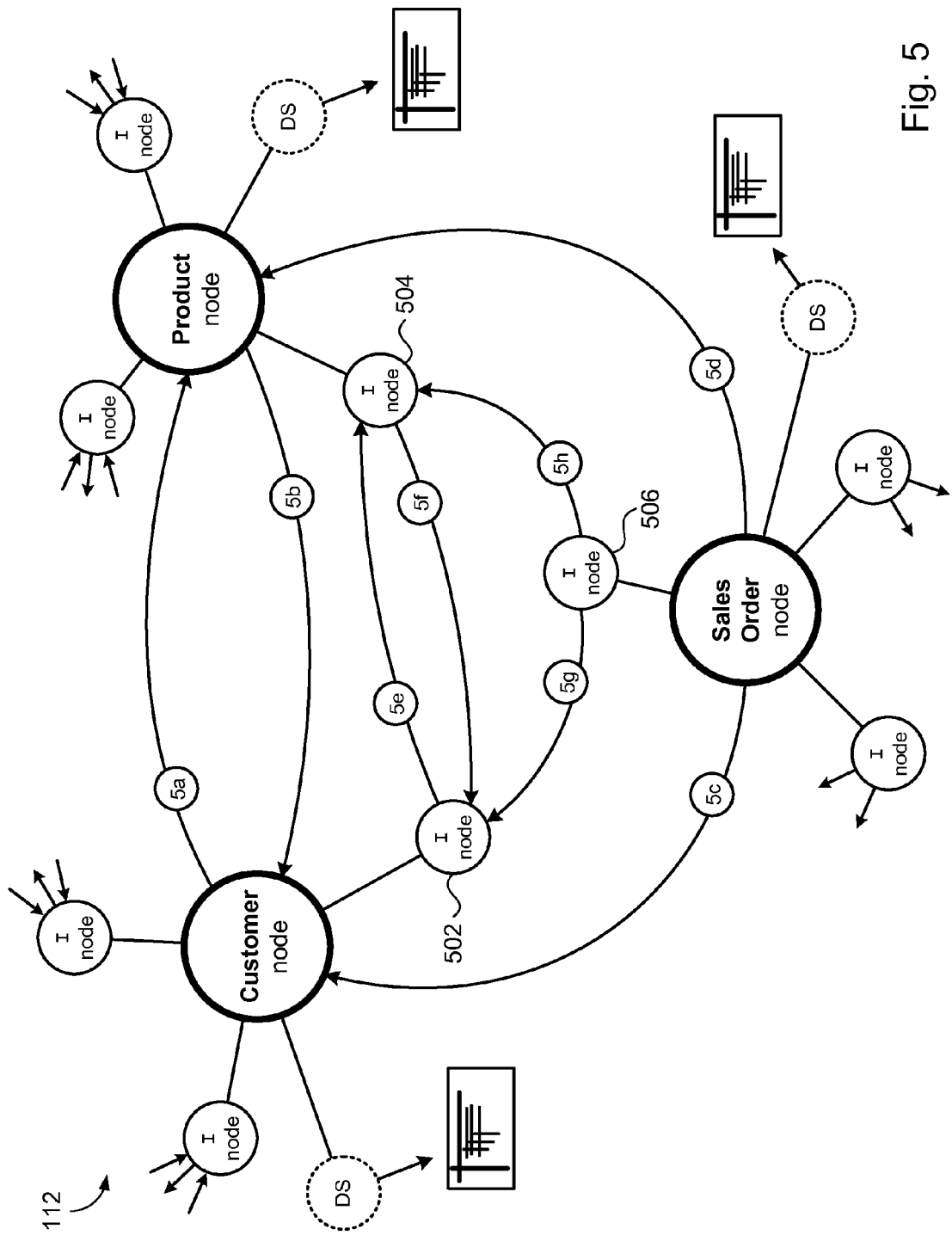
FIG. 5 shows an illustrative example of a knowledge graph loaded with enterprise data.

As explained above, the knowledge builder 118 can build the knowledge base 102 from a data source such as enterprise data 12. FIG. 5 shows an example of the knowledge graph 112 component of the knowledge base 102. The knowledge graph 112 may represent the above enterprise data 12 as three classes of data: Customer data, Sales Order data, and Product data. Accordingly, the knowledge graph 112 may include first level nodes called Customer, Product, and Sales Order. The property list 422 (FIG. 4) for the Customer node may include, for example, the name of the properties of instances of a customer (e.g., "customer name", "customer ID", and so on) and property information about the node itself (e.g., name of the node, such as "Customer", a node identifier, such as "34837", and so on).

FIG. 5 further illustrates that each first level node (e.g., Customer) may be linked to several second level instance nodes (I node), which represent instances of the class of data represented by the first level node. For example, each I node linked to the Customer node may represent an instance of a customer. Each I node linked to the Product node may represent an instance of a product, and each I node linked to the Sales Order node may represent an instance of a sales order. In some embodiments the instance data for each instance may be stored in the corresponding I node.

Each first level node (e.g., Customer) may be linked to a data source node (DS). For example, the Customer node may be linked to a data source node that points to or otherwise identifies a location (e.g., a database) where data for the instances of customers are stored. In some embodiments, rather than storing the instance data in the I nodes, the I nodes may point to or otherwise identify a specific record in the database which contains the instance data.

The knowledge graph 112 may represent the relationships between the Customer node, Product node, and Sales Order node using links 5a, 5b, 5c, and 5d. For example, the link 5a may represent the relationship that a customer "has purchased" a product, while the link 5b may represent the relationship that a product "has been purchased by" a customer. The link 5c may represent the relationship that a sales "was made by" a customer. The link 5d may represent the relationship that a sales "represents a sale of" a product. In some embodiments, the link information may be stored in the property lists 422 of the first level nodes.

In accordance with the present disclosure, the second level instance nodes (I node) inherit the linkage relationship(s) of the first level nodes that they are instances of. In other words, the second level instance nodes are linked to other second level instance nodes depending on how their respective first level nodes are linked. Consider for example, second level instance nodes 502 and 504. Node 502 is an instance of the Customer node, and node 504 is an instance of the Product node. Since the Customer node and the Product node are linked by links 5a and 5b, the nodes 502 and 504 may be similarly linked by links 5e and 5f to represent the fact a specific customer identified in node 502 "has purchased" (link 5e) a specific product identified in node 504. Conversely, the link 5f represents that the specific product identified in node 504 "has been purchased by" the specific customer identified in node 502.

Similarly, the second level instance node 506 is linked to second level instance node 502 by virtue of the first level nodes that they are instances of, namely the Sales Order node and the Customer node. Since the Customer node and the Sales Order node are linked by link 5c, the nodes 506 and 502 may be similarly linked by link 5g to represent the fact a specific sales order identified in node 506 "was made by" a specific customer identified in node 502. Likewise, second level instance node 506 (instance of Sales Order node) is linked to second level instance node 504 (instance of Product node) in the same way that their respective first level nodes are linked, namely by link 5d. Accordingly, nodes 506 and node may be linked by 5h to represent the fact a specific sales order identified in node 506 "represents a sale of" a specific product identified in node 504. As will be explained in more detail below, whether a second level node is linked to another second level node depends on the data that is loaded into the knowledge graph 112.

Figure 6:
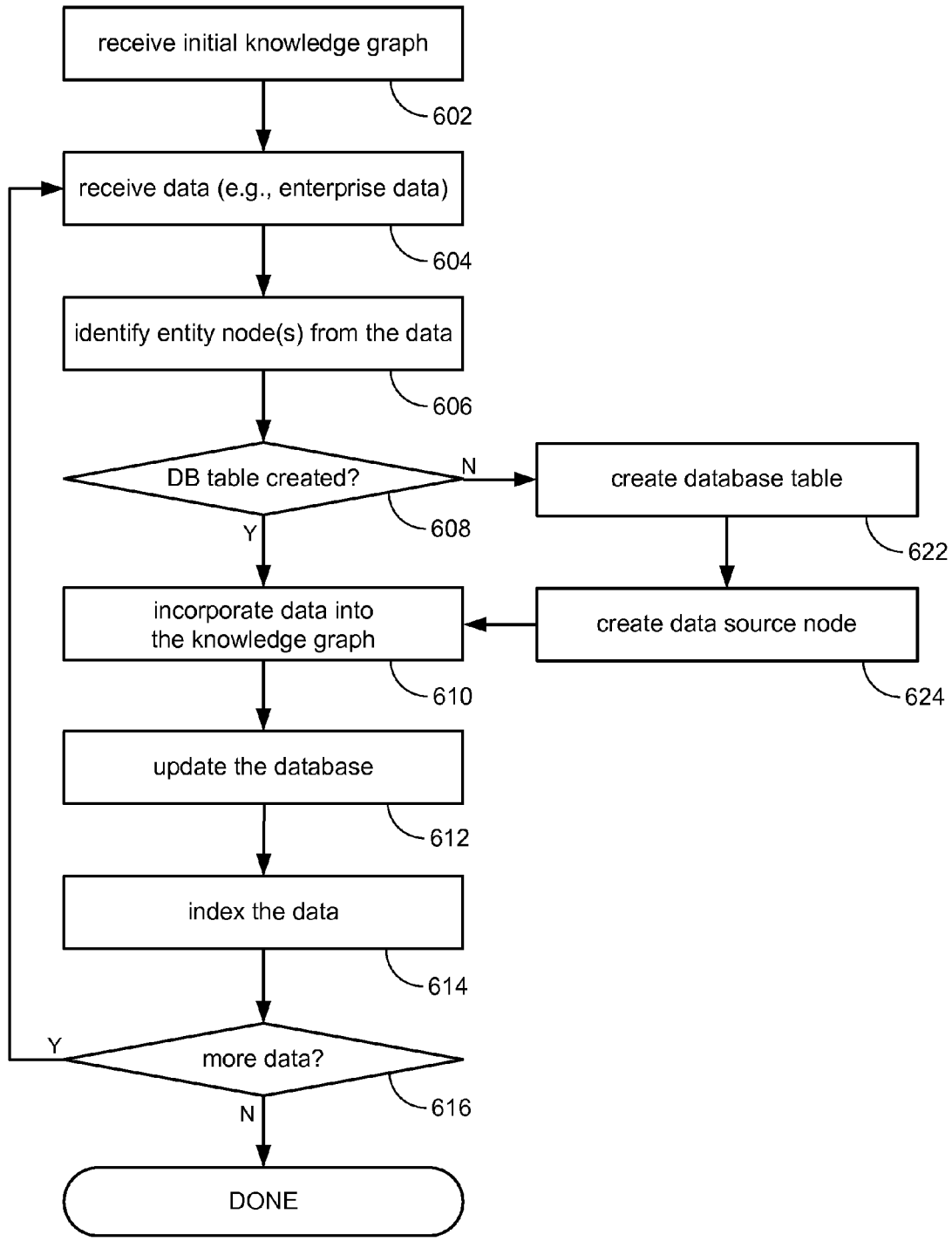
FIGS. 6 and 6A show high level processing by the knowledge builder in accordance with the present disclosure.

Referring now to FIG. 6, a high level logical description of a data loading operation performed by the knowledge builder 118 to build the knowledge base 102 in accordance with some embodiments of the present disclosure will now be discussed. The process of data loading will occur several times during the life of the knowledge base 102, to load new data into the knowledge base, to load updated data, or both. The data loading process flow will be explained in terms of the example embodiment of the knowledge builder 118 disclosed herein. It will be appreciated that the specific algorithms and process flows will vary depending on particular embodiments of the knowledge builder 118. It will be appreciated that the specific algorithms used to implement particular embodiments of the knowledge builder 118 will vary form one implementation to the next.

At block 602, the system 100 may receive and install an initial knowledge graph 18 to establish an initial state of the knowledge graph 112. This may occur, for example, when the system 100 is initially installed in an enterprise. As another example, if an existing knowledge base 102 needs to be re-initialized, the knowledge graph 112 may be set to an initial state by loading in the initial knowledge graph 18. The initial knowledge graph 18 may be designed and supplied by the provider of system 100, developed by an IT group in the enterprise, and so on.

Figure 7A:
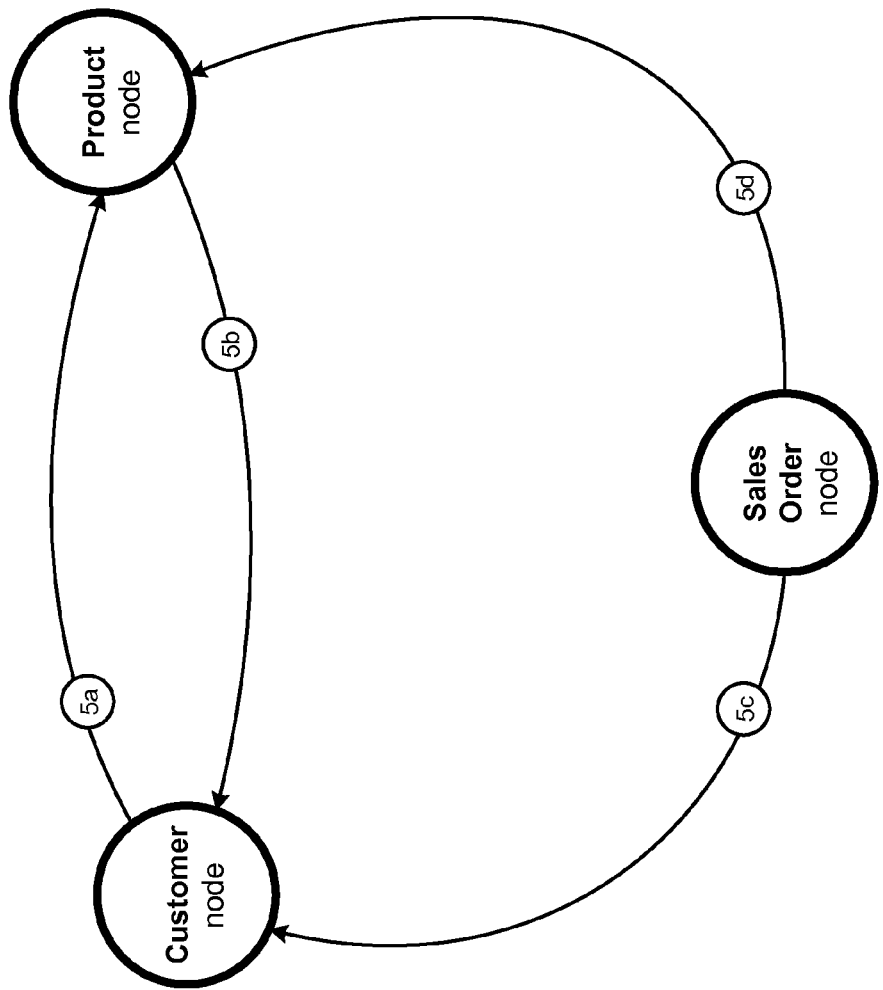
FIG. 7A depicts an example of an initial knowledge graph.

FIG. 7A shows an example of the initial state of the knowledge graph 112, comprising first level ("entity") nodes (e.g., Customer, Sales Order, etc.) and some links 5a-5e between some of the entity nodes. It is noted that the entity nodes, and any links between them, that comprise the initial state of the knowledge graph 112 need not match precisely the data structures of the enterprise data 12. As will be explained below, the knowledge graph 112 may be built up from its initial state as data from the enterprise is loaded into the system 100. Moreover, though the node structure of the knowledge graph 112 may be driven by the enterprise data 12 as the knowledge graph is built up, the resulting structure nodes in the knowledge graph may not (and need not) match the structure of the enterprise data that was used to build knowledge graph. This aspect of the present disclosure will be made more clear in the discussion below.

Returning to FIG. 6, at block 604, the system 100 (e.g., using the knowledge builder 118) may receive enterprise data 12 from the enterprise. The data may be presented by the enterprise from any source and in any suitable form. In some embodiments, for example, the data may be a data file (e.g., from a spreadsheet application) that an administrative user may provide to the knowledge builder 118. In other embodiments, the system 100 may be interfaced to some of the backend systems of the enterprise. Data may be loaded to the knowledge builder 118 directly from the enterprise backend systems. Typically, the data will be organized into rows of data, although this is not necessary. For discussion purposes, we can assume, without loss of generality, that the knowledge builder 118 receives or otherwise organizes the data into rows of data for incorporation into the knowledge base 102.

At block 606, the classifier 306 (FIG. 3) may analyze the received enterprise data 12 to identify which class of data, or classes of data, the enterprise data belongs to, and by so doing identify one or more entity nodes. In some embodiments, the enterprise data 12 may have headings that can be used to identify one or more suitable entity nodes. For example, if the enterprise data 12 is received as spreadsheet data (e.g., in a comma separated value, CSV, format), the first row may be a "header row" that includes headings like "customer name", "customer ID", and so on that describe the nature of the subsequent rows of data. In some embodiments, the classifier 306 may match the heading information in the received enterprise data against 12 data in the property lists 422 (e.g., node name) of each entity node to find a matching entity node. The classifier 306 may include suitable matching algorithms to identify exact matches or approximate matches between terms in the enterprise data 12 and terms in the property lists 422 of the entity nodes.

In some embodiments, the classifier 306 may use string matching algorithms to identify one or more entity nodes that best match the enterprise data 12 using whatever data is available in the enterprise data. This may be suitable when the enterprise data 12 does not have explicit header information. For example, the classifier 306 may attempt to match available text in the enterprise data 12 against any of the properties in the property lists 422 of the entity nodes. In some embodiments, for example, the classifier 306 may employ a metric called the Levenshtein distance, which measures how closely two strings match, to find a matching entity node. The enterprise data 12 may be sampled by the sampler helper module 308 to apply the matching algorithm(s) to a subset of the enterprise data 12, rather than processing all of the enterprise data. In other embodiments, several kinds of matching algorithms may be used to identify several candidate entity nodes, and a matching entity node may be selected from the list of candidates. And so on.

Further in block 606, the classifier 306 may map the columns of data in the received enterprise data 12 to one or more properties (vis-à-vis the property list 422) of the identified entity node. In some embodiments, the same or similar processing described above to identify the entity node may be used to map columns of data to the entity's properties.

The classifier 306 may map the received enterprise data 12 to more than one entity node. For example, some rows of data in the received enterprise data 12 may map to one entity node, while other rows of data map to another entity node. In addition, some columns of data in the received enterprise data 12 may map to properties of one entity node, while other columns of data may map to another entity node.

In some embodiments, if the classifier 306 does not identify any entity nodes from the knowledge graph 112 that map to the received enterprise data 12, then the classifier 306 may create a new entity node and add it to the knowledge graph 112. In this way, the classifier 306 can "grow" the knowledge graph 112 to incorporate data that was not previously contemplated. An administrative tool may be provided to allow an administrator to supply information about the newly added entity node, e.g., a node name and property data, linkage to other entity node(s), and so on. For purposes of discussion we can assume, without loss of generality, that the classifier 306 has identified only one entity node from among the entity nodes comprising the knowledge graph 112.

Figure 7B:
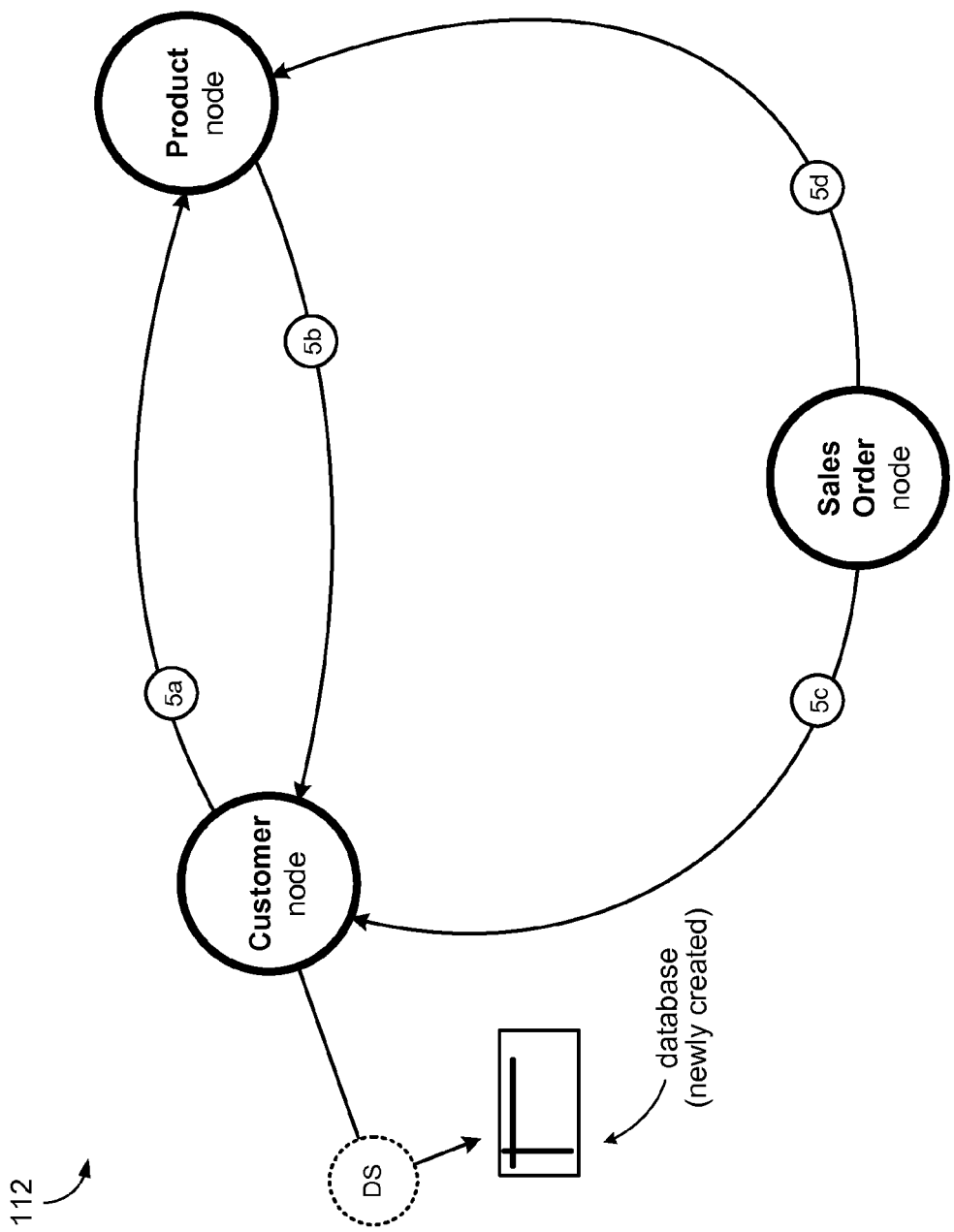
FIGS. 7B and 7C illustrate changes to the initial knowledge graph during a loading sequence.

At block 608, a determination is made whether the entity node identified at block 606 is associated with a data store, such as a database. As explained above, the database may be used to store instance data for instances of the class of data represented by the identified entity node. If no database has been created, then at block 622, the knowledge builder 118 may create a database table. The name of the database table, for example, may be based on the name of the identified entity node. At block 624, a data source node (DS) may be created and added to the knowledge graph 112 (see for example, FIG. 7B), for example, by linking the data source node to the entity node identified at block 606. The data source node DS may contain information about the database table, for example, its name, information about how to access it, what columns comprise the database table, and so on.

At block 610, the received enterprise data 12 may be incorporated into the knowledge graph 112 using the identified entity node as an entry point into the knowledge graph. For example, each row of data in the received enterprise data 12 may represent an instance (e.g., customer) belonging to the class of data that is represented by the identified entity node. The knowledge builder 118 may create one or more instance nodes (I node) for each row of data. Each instance node may be linked to the identified entity node.

The knowledge builder 118 may store each row of data into a corresponding instance node (I node). In some embodiments, the property list 424 (FIG. 4) of the corresponding instance node may be used to identify the data ("instance data") from the given row of data. Data in the given row of data that does not map to any of the properties in the property list 424, may be stored in the corresponding instance node as "unclassified."

As explained above (e.g., in connection with FIG. 5), entity nodes may be related. For example, the Customer node may be related to the Product node by the relation "has purchased" (link 5a), the Sales Order node may be related to the Product node by the relation "represents a sale of" (link 5d), and so on. When instance nodes are created and linked to their respective entity nodes, the instance nodes may be related to other instances nodes based on the relationships between the respective entity nodes that they are instances of. Accordingly, processing in block 610 may include linking an instance node to other instance nodes in the knowledge graph. This aspect of the present disclosure will be discussed below in connection with FIG. 6A.

At block 612, the database that is associated with the identified entity node may be updated with the contents of the received enterprise data 12 that was used to identify the entity node. The updates may include adding rows of data from the received entity data 12 into the database. If a row of data is already stored in the database, then that row may be updated with any new data contained in that row of data. For example, if the row of data refers to a customer that is already represented in the database (e.g., from a previous data loading operation), then the information stored in the database may be updated. If the received enterprise data 12 includes columns of data that were not previously represented in the database, the database may be extended to include additional columns to accommodate the new data.

Figure 7C:
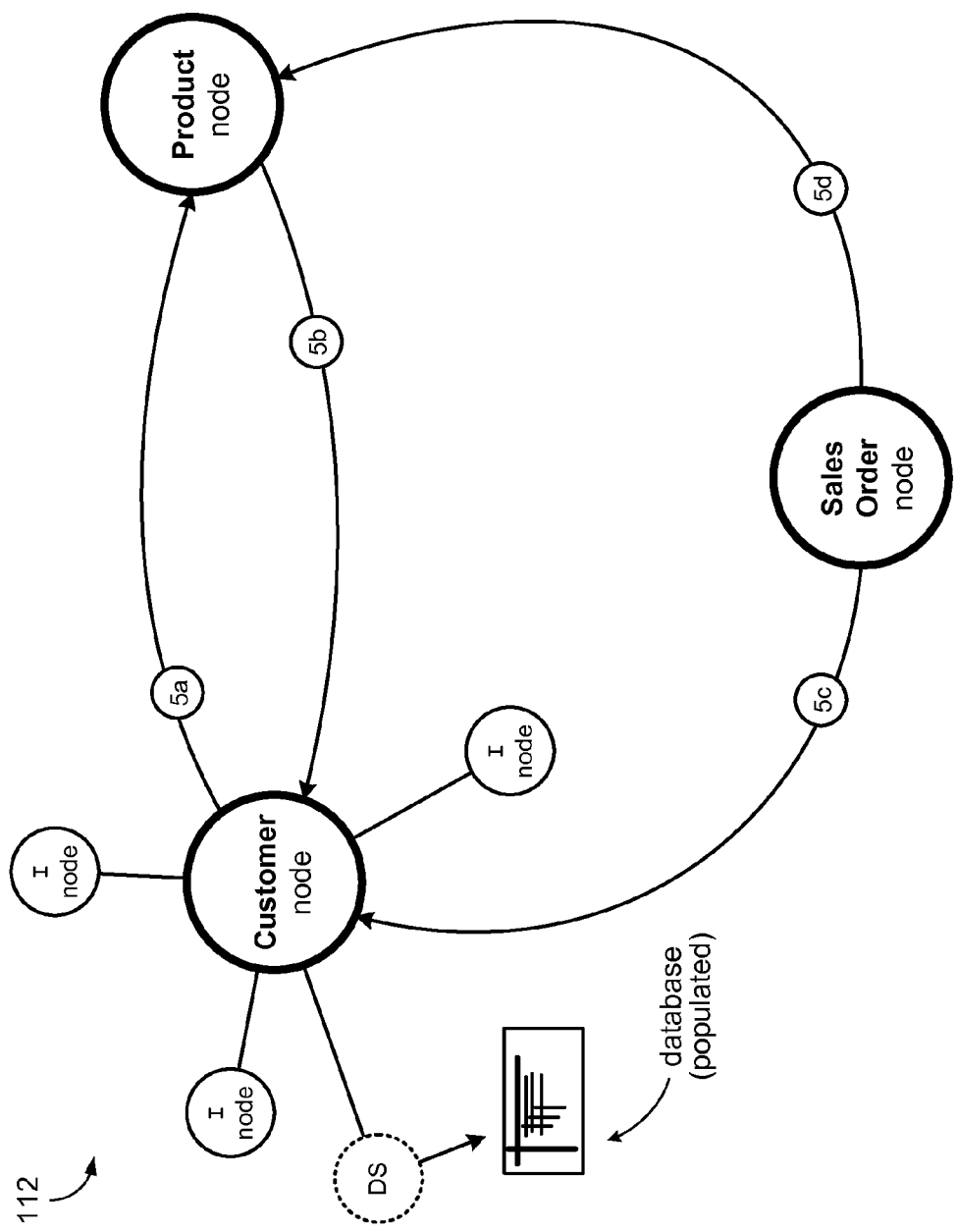

FIG. 7C illustrates an example of the state of the knowledge graph 112 at this point in the discussion of FIG. 6, where the identified entity node is the Customer node. The data source node DS points to a database that has been created (e.g., at block 622) and associated with the Customer node. The knowledge graph 112 shows three instances of the Customer node (i.e., three customers), where the data for each instance may be obtained from the received enterprise data 12 and stored in a corresponding instance node (I node). In addition, the instance data for each instance node may be stored in the database pointed to by the data source node DS.

Returning to FIG. 6 at block 614, in accordance with the present disclosure, the knowledge builder 118 may cross reference the received enterprise data 12 into index 114. The index 114 may cross reference the enterprise data 12 with references to corresponding nodes in the knowledge graph 112 that store the data. For example, each data value in the enterprise data 12 may be cross referenced, as an indexed value, with a node in the knowledge graph 112. In some embodiments, where the data value is a text string, the knowledge builder 118 may cross reference sub-strings of the text string in addition to cross referencing the entire string.

Figure 7D:
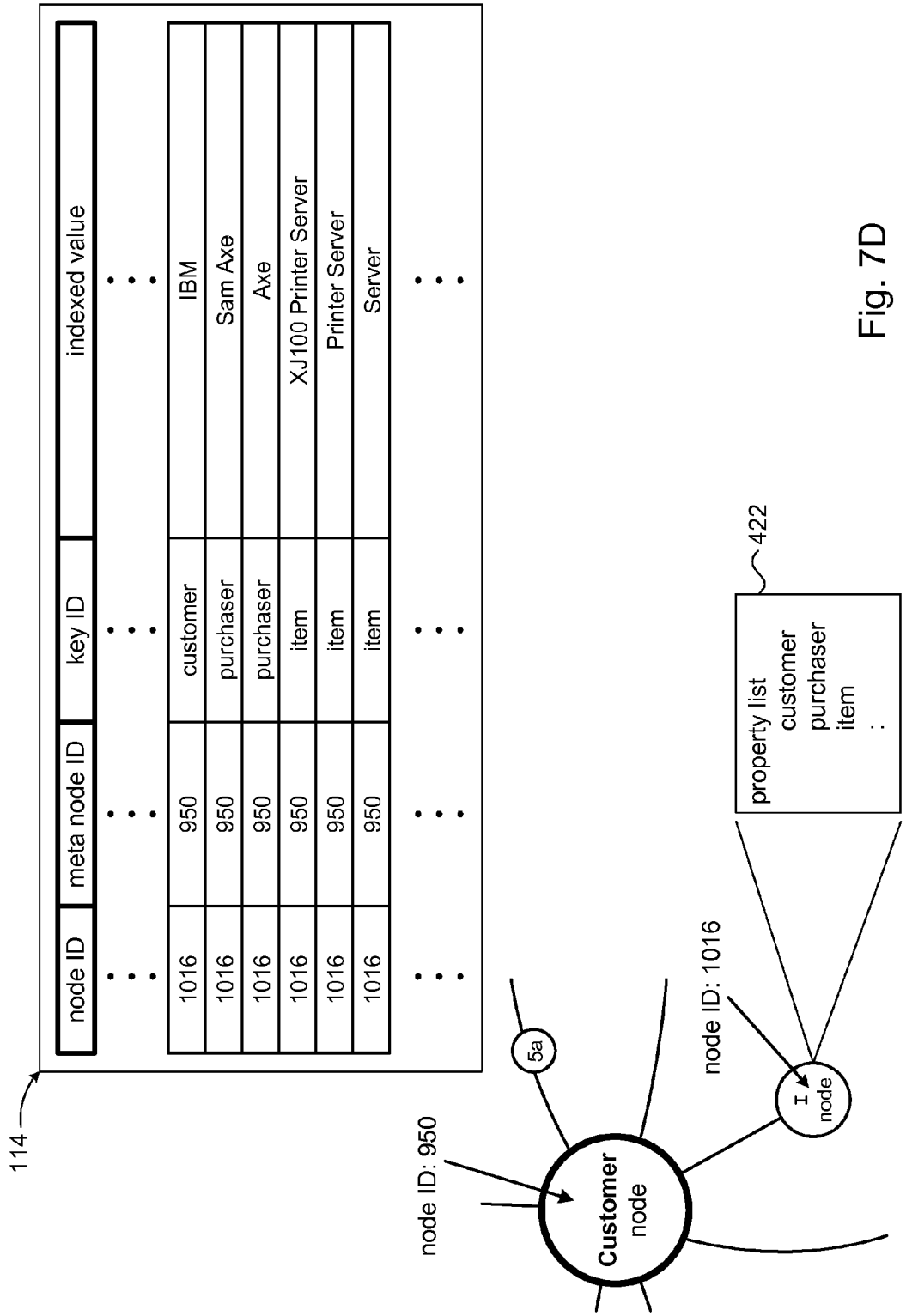
FIG. 7D depicts an example of an index in accordance with the present disclosure.

FIG. 7D illustrates an example of an index 114 in accordance with the present disclosure. The index 114 may be organized as a table of indexed values. Each indexed value may be stored in a value field of the index 114. A node identifier (node ID) field may uniquely identify each node comprising the knowledge graph 112; e.g., entity node, instance node, data source node, etc. The node ID field identifies the node that the indexed value appears in; e.g., the value may appear in the properties list 422 (entity node) or 424 (instance node).

The index 114 may further include an entity node ID field that identifies the entity (first level) node associated with an indexed value. If the indexed value appears in an instance node (e.g., in the property list 422 of the instance node), then the entity node ID would identify the entity node that the instance node "is an instance of." If the indexed value appears in an entity node, then the node ID and the entity node ID for that indexed value would be the same. The index 114 may further include a key ID field that identifies which property in the properties list 422 (of the entity node) or properties list 424 (instance node) that the indexed value is associated with.

FIG. 7D further illustrates an example of a row of data 702 that may be indexed in index 114. The row of data 702 represents an instance of the Customer node. The data includes a customer (IBM), a purchaser (Sam Axe, presumably a purchasing agent at IBM), and a purchased item (XJ100 Printer Server). The instance node that corresponds to data 702 is identified by ID "1016". The entity node that the instance node "is an instance of" is identified by ID "950". In accordance with the present disclosure, the text string "Sam Axe" may be indexed as indexed values "Sam Axe" and "Axe", each being associated with the same key ID "purchaser". Likewise, the text string "XJ100 Printer Server" may generate three indexed values, each being associated with the key ID "item".

Figure 6A:
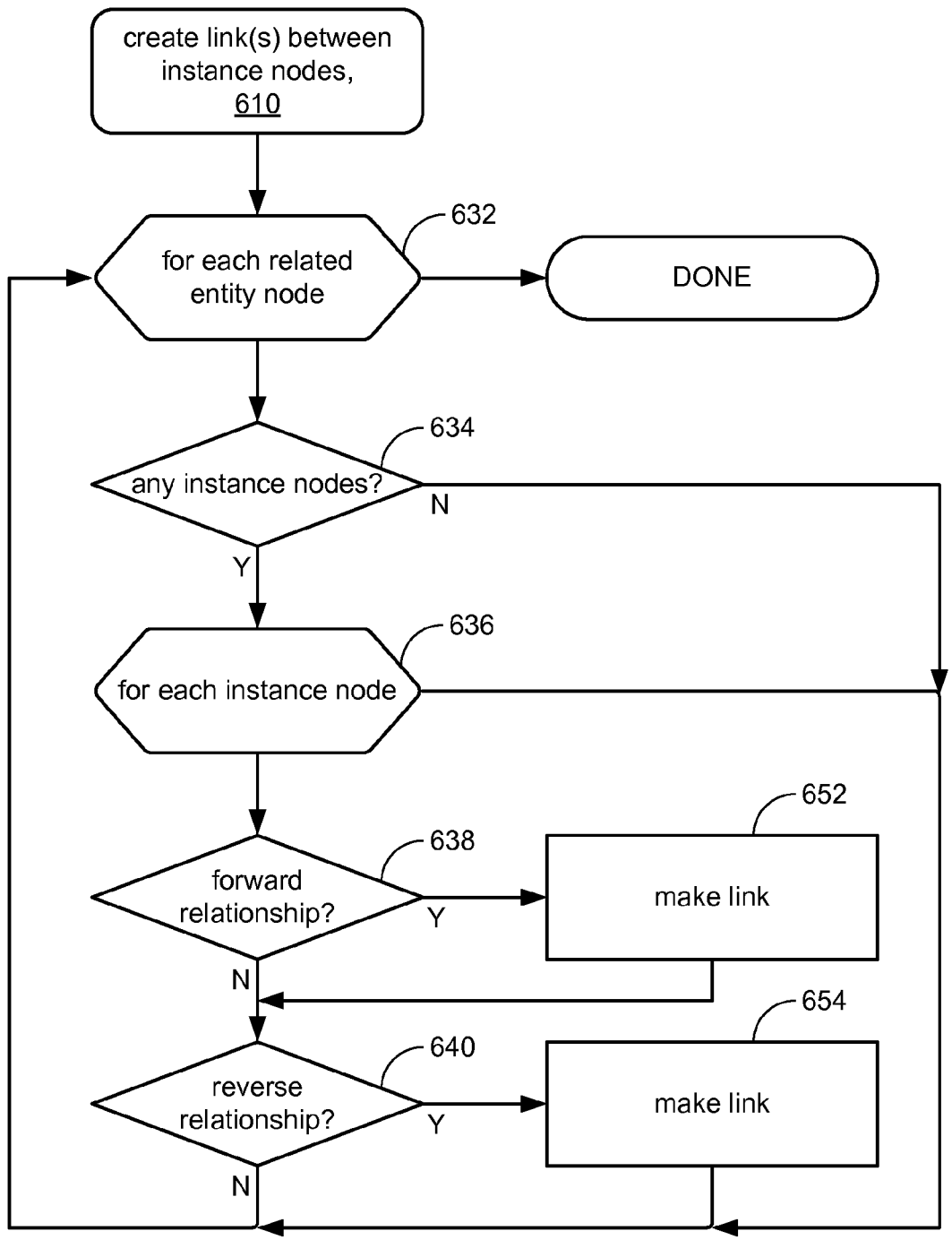
Figure 7E:
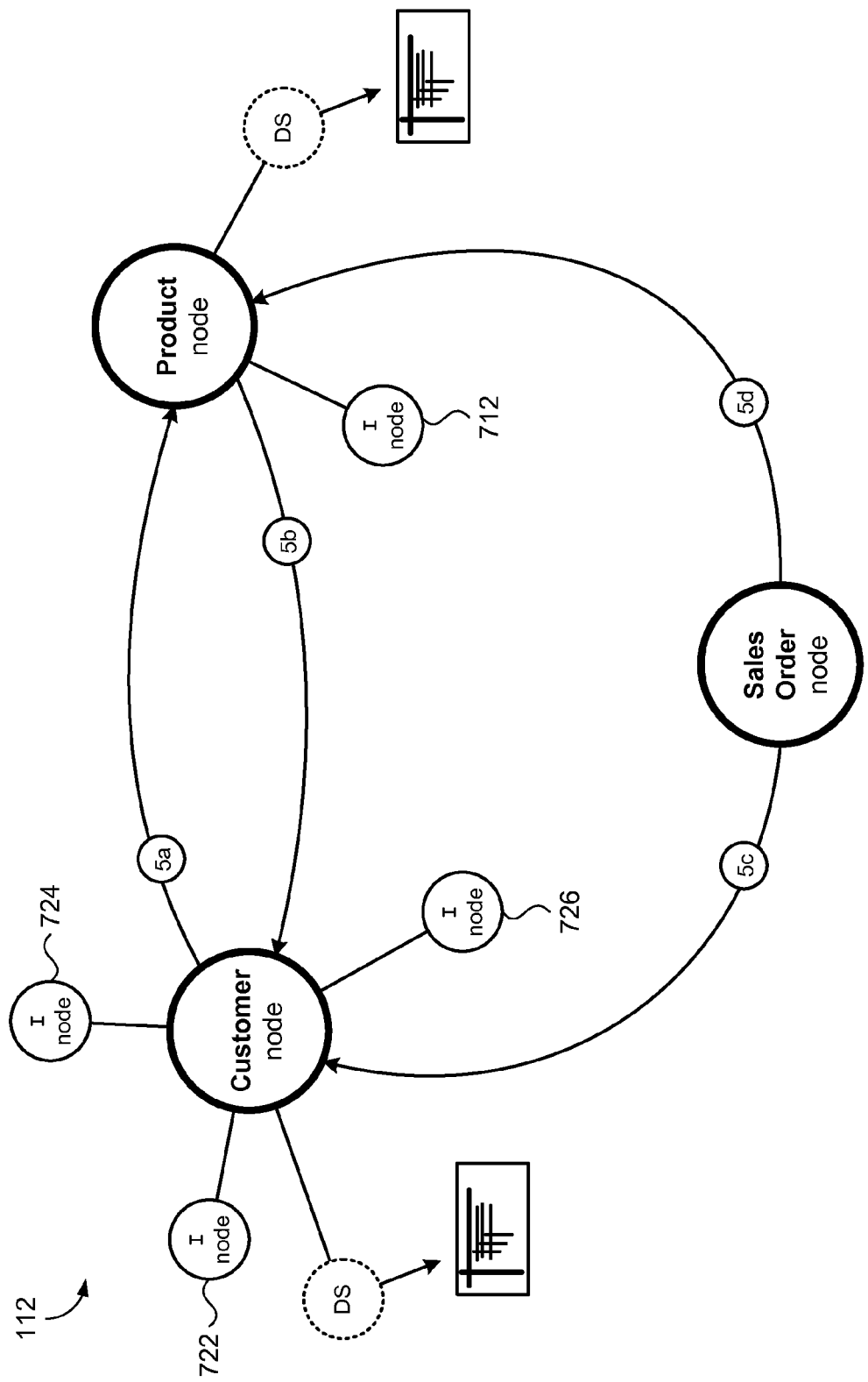
FIGS. 7E and 7F illustrate linking between instance node.

Referring to FIG. 6A, the discussion will now turn to the linking of instance nodes. Recall from the discussion of block 610 above the in addition to creating and linking instances nodes to their respective entity nodes, that linking between instance nodes may be performed. This can happen when the knowledge graph 112 contains two or more entities. FIG. 7E illustrates a state of the knowledge graph 112 having two entity nodes Customer and Product. The figure represents the addition of a product instance 712 to the knowledge graph 112 in accordance with block 610. FIG. 6A will not describe the linking of instance nodes that may be performed in block 610.

The knowledge builder 118 may execute loop 632 for each entity node that has a relation to the target entity node. For example in FIG. 7E, the figure represents the addition of an instance to the Product node, which we will call the "target" node. Nodes that have a relation to the target node (e.g., Customer and Sales Orders) may be referred to as "related" nodes. The knowledge builder 118 will process each related node in turn in loop 632.

Suppose the related node Sales Order is processed first. The evaluation at block 634 in the first iteration of loop 632 will result in NO, since the knowledge graph 112 currently has no instance nodes for Sales Order, thus ending the loop 632 for Sales Order.

Figure 7F:
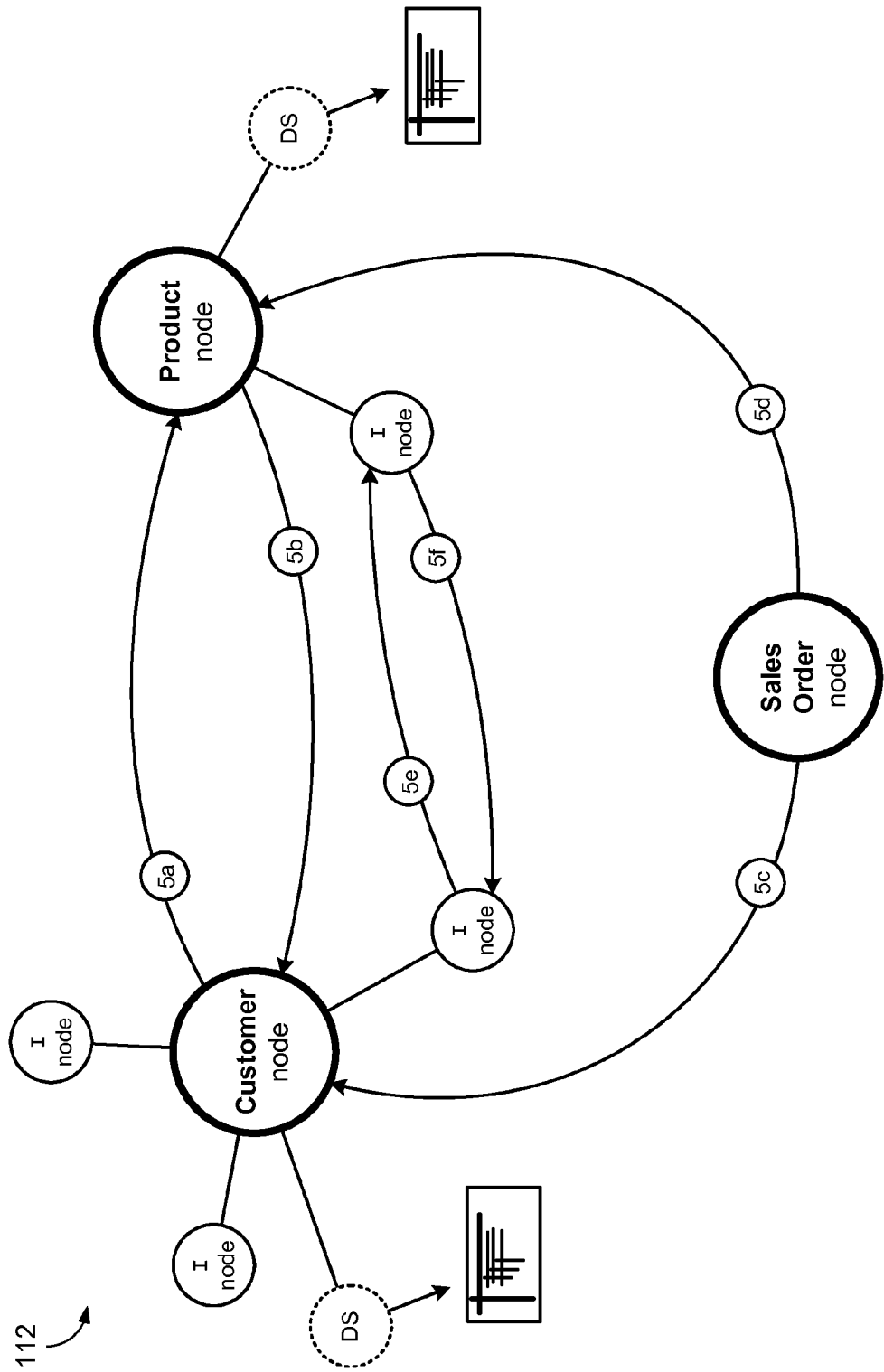

The loop 632 will be repeated for the next related entity node, Customer. Block 634 will evaluate to YES for three iterations of the loop 632 because Customer has three instance nodes. Accordingly, the process builder 118 will consider each instance node of Customer, in turn, through loop 636. Thus, for example, loop 636 may be iterated to process instance node 722, then instance node 724, then instance node 726. The following are performed in loop 636:

At block 638 if the related entity node (Customer) has a forward relation to the target entity node (Product), then the knowledge builder 118 determines if that same forward relationship exists between the instance node under consideration (722, 724, or 726) and the target instance node (712). Referring to FIG. 5, the relationship represented by link 5a may be referred to as a "forward" relationship in the direction from Customer to Product, namely the relationship "has purchased." In accordance with the present disclosure, the knowledge builder 118 may use data in the properties list 424 of the instance node under consideration and data in the properties list 424 of the target node to evaluate whether the same forward relationship exists between them as between their respective entity nodes that they are instances of. For example, the properties list 424 for the Customer instance may include a field called "item purchased" and the properties list 424 for the Product instance may include a field called "item name." The forward relation "has purchased" may then be evaluated by comparing the "item purchased" data value and the "item name" data value. If block 638 evaluates to YES, then at block 652 a link (e.g., 5e, FIG. 7F) between the Customer instance and the Product instance may be created.

A similar evaluation is made at block 640, but for a reverse relationship. Referring to FIG. 5, link 5b may be referred to as a "reverse" relationship because the relationship is expressed in the direction from Product to Customer, namely Product "has been purchased by" Customer. Since the evaluation in block 640 is being made with respect to the Customer entity, the term "reverse" is used. If block 640 evaluates to YES, then at block 654 a link (e.g., 5e, FIG. 7F) between the Customer instance and the Product instance may be created. Processing in loop 636 is then repeated.

This concludes the discussion of how an organization's data (e.g., enterprise data 12 from a business enterprise) can be loaded into the knowledge base 102 and represented in the knowledge graph 112 in accordance with the present disclosure. It will be appreciated that additional data sources 14 such as public data can be loaded into the knowledge base 102 in similar fashion. An advantageous aspect of the system 100 is that the organization's data is not simply loaded into storage as raw data; the system also represents the data in terms of the organization's understanding of the data and the context in which that data is used and referenced.

The discussion will now turn to a description of searching, querying, or otherwise accessing (collectively referred to herein as "searching") the knowledge base 102. Referring for a moment to FIG. 1, in accordance with the present disclosure, a collection of applications 108 may be provided to produce search output that is relevant to the user by invoking an application from the collection that is suited to the user's search input. The collection of applications 108 may be extendable to allow for new applications to be added to the collection to provide for new kinds of search capability that users may require. The applications may include data processing capability, such as analytics, reporting, and so on to produce output that is appropriate for the user's search input.

Figure 8:
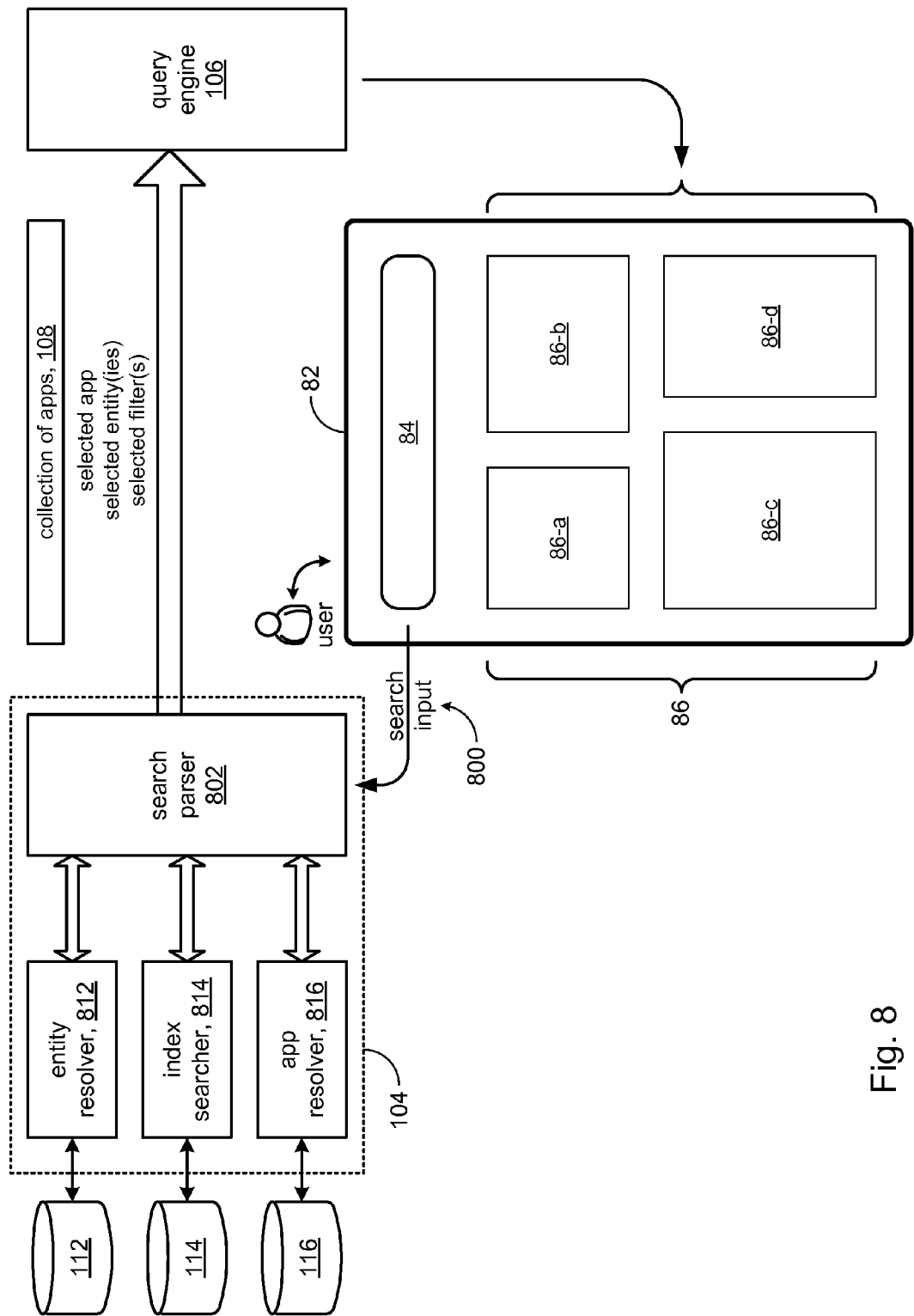
FIG. 8 illustrates details of a search input engine in accordance with the present disclosure.

Referring now to FIG. 8, in accordance with the present disclosure, the search input engine 104 may receive search input 800 from a user. In some embodiments, for example, the user may enter their search input 800 in an input area 84 presented on an output device 82 (e.g., computer monitor, touchscreen display, etc.) of a computing device. The search input engine 104 may process the search input 800 in accordance with the present disclosure by selecting an application from the collection of applications 108, and invoking the query engine 106 to process the search input using the selected application.

In some embodiments, the search input engine 108 may comprises a search parser 802, an entity resolver module 812, an index searcher module 814, and an application ("app") resolver module 816. The search parser 802 may parse the search input 800 to provide terms from the search input and/or terms derived from the search input to the entity resolver 812, the index searcher 814, and the app resolver 816. The entity resolver 812 may interface with the knowledge graph 112 to access information comprising the knowledge graph to identify candidate entities based on the search input 800. The index searcher 814 may interface with the index 114 also to identify candidate entities based on the search input 800. The app resolver 816 may interface with the database system 116 to identify an application to invoke using information provided by the entity resolver 812 and the index searcher 814.

The search parser 802 may produce information about a selected application, selected entity(ies), and one or more filters and provide that information to the query engine 106 to process search input 800. Output 86 produced by the selected application may be presented on the output device 82, for example, in various output areas 86-*a*, 86-*b*, 86-*c*, 86-*d* on the display device 82. It will be appreciated that any suitable presentation is contemplated, including producing a hardcopy output (e.g., on a printer), sending the output 86 to a recipient on a different computer system (e.g., email), and so on.

Figure 9:
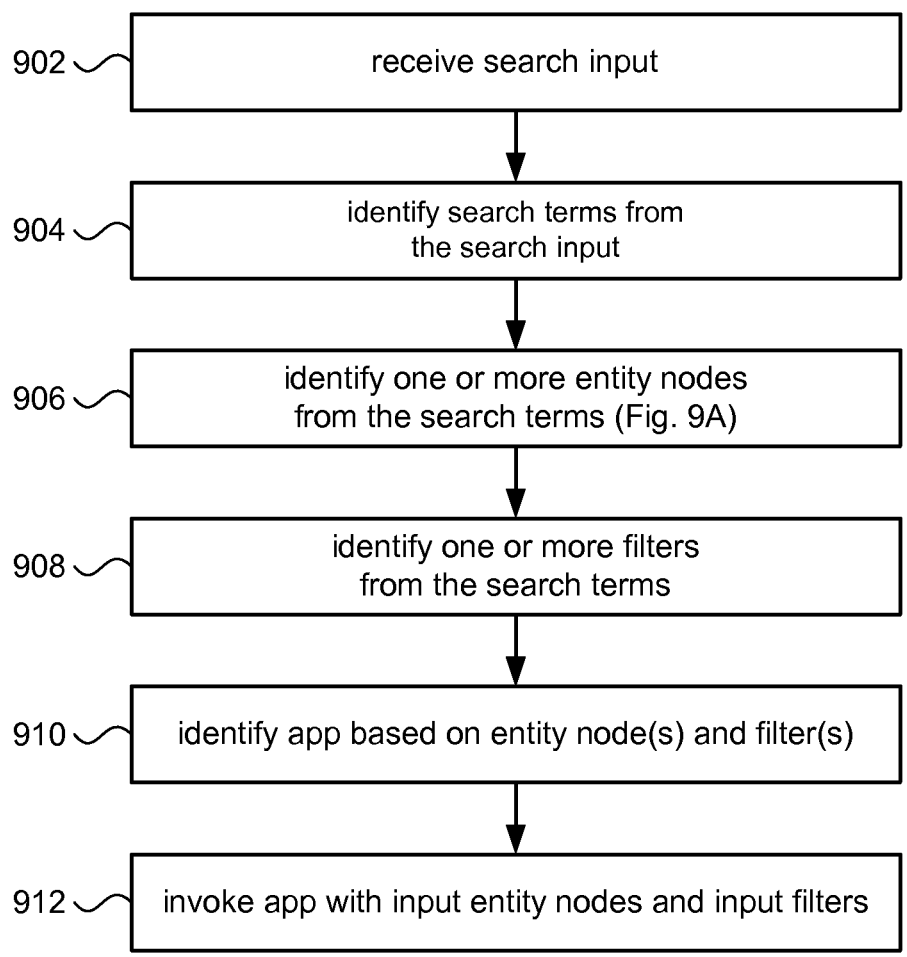
FIGS. 9, 9A, and 9B show high level processing by the search input engine in accordance with the present disclosure.

Referring to FIG. 9, a high level logical description of processing by the search input engine 104 in accordance with some embodiments of the present disclosure will now be described. More specifically, the process flow will be explained in terms of the example embodiment of the search input engine 104 disclosed herein. It will be appreciated that the specific algorithms and process flows will vary depending on particular embodiments of the search input engine 104.

At block 902, the search input engine 104 may receive a search input from a user. At block 904, the search parser 802 may parse the search input to generate "search terms" from the search input. In some embodiments, the search parser 802 may use natural language processing techniques in order to identify meaningful word groupings. In other embodiments, the search parser 802 may employ other language processing technologies to analyze the search input. Search terms produced by the search parser 802 may include the individual words contained in the search input, as well as groupings of words in the search input. For example, if the search input is "Sales of ETL product in North America", the search parser 802 may generate the following search terms: "sales," "ETL," "ETL product," and "North America."

In some embodiments, the search parser 802 may derive search terms from the search input that may include words/phrases that are not in the search input. For example, search terms may be derived by considering terms that are synonymous with words or phrases in the search input; e.g., the word "purchaser" may generate derived search terms such as "buyer," "customer," and so on. In other embodiments, the search parser 802 may take into account spelling errors, and so on.

At block 906, the search terms obtained from the search input may be used to identify one or more first level entity nodes from the knowledge graph 112. As will be explained below, the identified entity nodes provide the sources of data against which the search input will be processed; e.g., the data stores 42 via data source nodes 406, FIG. 4. In some embodiments, processing in block 906 may be coordinated by the search parser 802, using the entity resolver 812 and the index searcher 814.

Details of the processing in block 906 will be explained in FIG. 9A below. Briefly, entity nodes will be identified based on the search terms produced from the search input. Accordingly, the identified entity nodes, and hence the data sources provided by those entity nodes, will be relevant in terms of the semantics and context of the knowledge graph base 102 because the entity nodes will be identified based on how the search terms from the search input are related by the knowledge graph 112. This represents an important advantage because a user in the enterprise will likely compose a search input from the point of view of the enterprise knowledge as it is represented in the knowledge base 102. The data sources against which the search input will be processed and the resulting output can therefore be highly relevant to the user.

At block 908, the search terms obtained from the search input (block 904) may be used to generate one or more "filters." Filters serve to limit the amount of information that is retrieved when processing the search input to obtain results. Details of the processing in block 908 will be explained in FIG. 9B below. As will be explained, the search term(s) that will be included in the filter(s) will be selected based on how the search terms are related by the knowledge graph 112. Accordingly, filters may provide filtering of the retrieved data to filter out irrelevant data and retain data that is relevant with respect to the semantics and context of the knowledge base 102. This represents an important advantage because the data will be filtered based on the semantics of the user's search input.

At block 910, the entity nodes identified in block 906 and the filters generated in block 908 may be used to identify a selected application from the collection of applications 108. The processing of block 910, for example, may be performed by the app resolver 816. In some embodiments, information (meta data) about each application may be stored in the database system 116. Application metadata may include, for example, the entity node(s) that the application expects to use, what filters the application expects, input parameters, and so on. A best match between the application metadata and the identified entities and filters may be used to select an application to process the user's search input.

At block 912, the selected application may be invoked. In some embodiments, the entity nodes identified in block 906 and the filters generated in block 908 may be passed as inputs to the selected application. Recall from FIG. 4 that each entity node (e.g., 402*a*) is linked to a data source node 406*a*. The data source node 406*a*, in turn, points to a data store 42 that contains the data comprising instances of the entity node; for example, if the entity node is Product, the data store will contain information about specific products (i.e., Product instances). The entity node(s) that are passed to the selected application, therefore, provide data source(s) for the selected application. The particular data that the selected application extracts from the data source(s) may be controlled (filtered) by the filter(s) that are passed to the selected application.

Figure 9A:
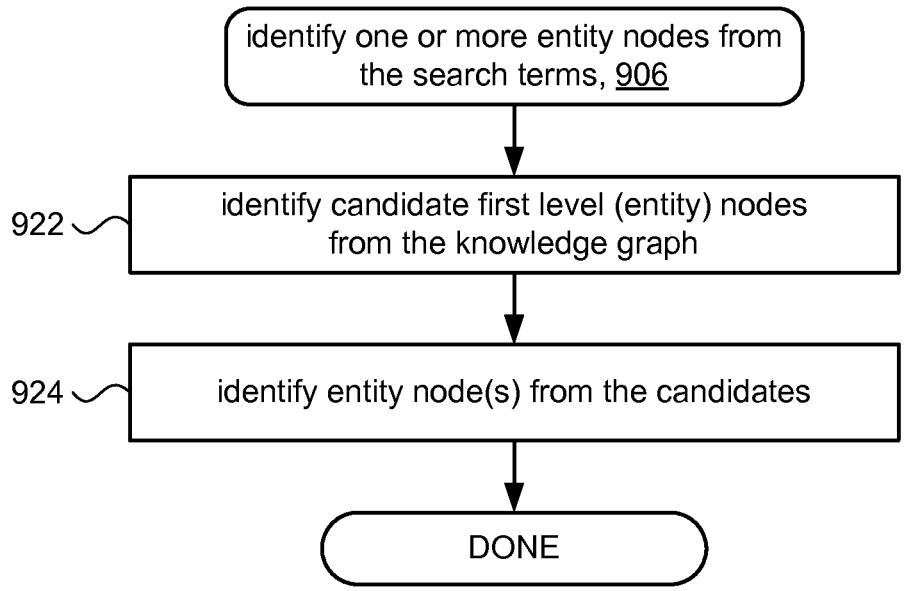

Referring now to FIG. 9A a high level logical description of processing in the search input engine 104 to identify entities using the search terms (block 906) will now be discussed. At block 922, the search terms generated from the search input at block 902 may be used to identify a set of candidate entity nodes in the knowledge graph 112. In some embodiments, for example, the search parser 802 may pass the list of generated search terms to the index searcher 814. The index searcher 814 may search the index 114 for each search term. Referring for a moment to FIG. 7D, for example, the index searcher 814 may search the value field of the index 114 for instances of each search term. For example, if the search input is "forecast for printer servers", the search terms may include: "forecast," "printer," and "printer server." Accordingly, the index searcher 814 may retrieve entries from the index 114 that have values for "forecast," "printer," and "printer server." For each entry that is retrieved, its node ID field and entity node ID fields are recorded, for example, in a list of candidate entity nodes. After all the search terms have been searched for, the index searcher 814 may pass the final list of candidate entity nodes to the entity resolver 812 for processing in block 924.

At block 924, the list of candidate entity nodes represents all the nodes in the knowledge graph 112 that relate to the search input because the search terms used to identify the candidates were derived either literally or by equivalence (e.g., synonymous) from the search input. In accordance with the present disclosure, the entity node(s) to be used with the selected application (blocks 910, 912) will be identified from the candidate entity nodes based on their relationships in the knowledge graph 112. By so doing, the entity node(s) that feed into the selected application may provide data source(s) that are particularly relevant to the search input in terms of the user's understanding and context.

The entity resolver 812 may compare "distances" between entity nodes in the list of candidates to determine relevancy. For example, two entity nodes that are separated by a "short" distance (say, one or two links) may be deemed to be relevant to each other, and thus may remain in the list of candidates for further analysis. If the separation distance is "far" (say four or more links), then one or both of the entity nodes may be removed.

Another basis for relevancy may be based on the connectivity (linkage) among the entity nodes. If an entity node in the list of candidates is not linked to any other entity node in the list, for example, then that entity node may be removed from the list of candidates, since it has no relationship with any other entity node in the list and thus that entity node may be deemed to have no relevance to the user's search input.

For example, a simple search input "Smith sales" may generate search terms "smith," and "sales". Suppose a search on the index 114 using "smith" results in a match of entity nodes Customer (e.g., because there is a customer called Smith) and Vendor (e.g., because another "Smith" is a vendor to the enterprise), and a search on "sales" results in a match of the Sales Order entity node. The resulting list of candidate entity nodes comprises Customer, Sales Order, and Vendor. Suppose further that in the knowledge graph 112, the Customer and Sales Order entity nodes are linked. Since a vendor typically has no relationship with the enterprise's customers or with the enterprise's sales orders, we will suppose that the Vendor entity node is not linked to either the Customer entity node or Sales Order entity node. The question is, which entity node, Customer or Vendor, is correct of the given search input? Since Customer and Sales Order are linked, it is likely that the Customer entity node is relevant to the search input. Considering that Vendor is not linked to either Customer or Sales Order, the Vendor entity may be removed from the list of candidates.

It can be appreciated from the foregoing that the entity resolver 812 the resulting entity node(s) selected from the list of candidate entity nodes are semantically relevant to the search input in the context of the knowledge graph 112. Search terms generated from the search input are used to identify all the entity nodes in the knowledge graph 112 that may be relevant to the search input. Relevance is then determined by assessing the list of candidate entity nodes against the knowledge graph 112, for example, by eliminating entity nodes that are far away from other entity nodes. The remaining entity nodes may then provide a source of data (via their respective associated data stores 42) that the selected application may then use to process the search input.

Figure 9B:
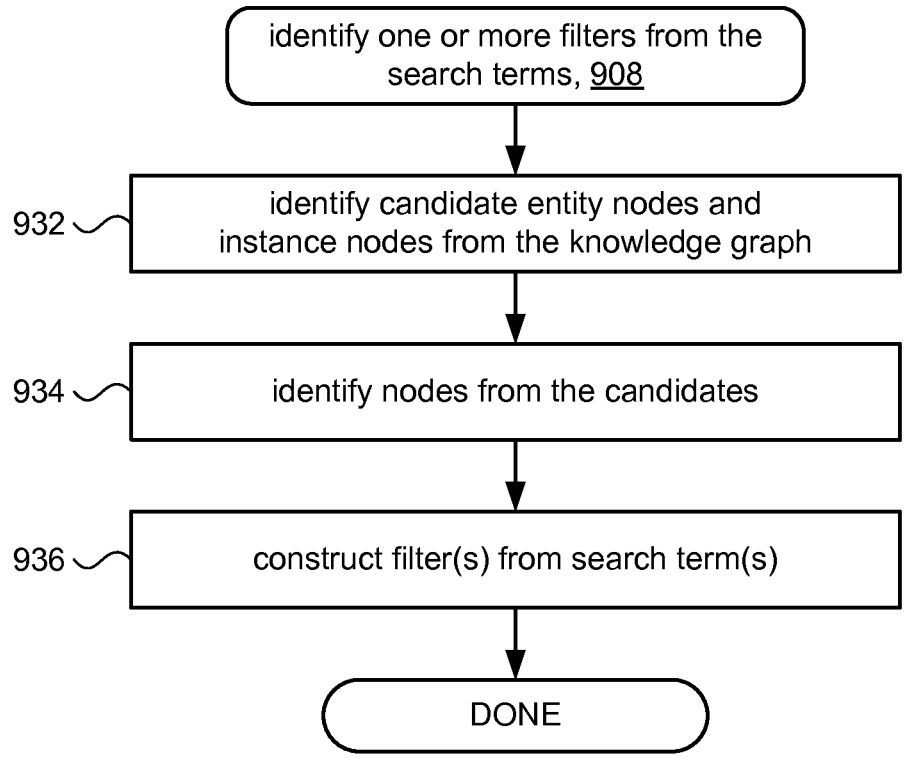

Referring now to FIG. 9B a high level logical description of the processing of block 908 to identify search terms (block 906) to be used as filters will now be discussed. At block 932, a list of candidate nodes may be identified from the knowledge graph 112. In some embodiments, for example, each search term obtained from the parsing in block 904 may be searched against the index 114. The list of candidate entity nodes and instance nodes may be obtained from hits on the index 114.

At block 934, the list of candidate entity nodes and instance nodes may be analyzed against the knowledge graph 112 to identify entity and instance nodes that are related. For example, as discussed above, distances between entity nodes may be used to eliminate either or both of the entity nodes from the candidate list. Connectivity among the nodes in the candidates list may be used to eliminate nodes. For example, instance nodes in the candidates list that are not connected to entity nodes in the candidates list may be eliminated. The remaining nodes in the candidates list may be viewed nodes that have been identified as being relevant to the user's search input in the context of the knowledge represented in the knowledge graph 112.

At block 936, one or more filters may be constructed using the entity and instance nodes that have been identified at block 934. In some embodiments, for example, the filters may be expressed in terms of the search terms, node IDs, attribute/value pairs, and the like.

The "values" are the search terms that correspond to the identified nodes. The "attributes" may be obtained form the properties list (e.g., 422 for entity nodes, 424 for instance node, FIG. 4) of the respective entity or instance node where the search term was found.

Following is an example that illustrates the foregoing for the search input "Customer 123":

Input
   App: Search
   App Parameters: NULL
   Entities:
      Entity: nodeid(65)
      EntityName: Customer
   FilterValue: *123*
      MatchedNodes: nodeid(3243), nodeid(5), nodeid (143)
      MatchedValues: Cust123, Cust456, Cust789
      MatchedAttributeValuePairs: Customer Number: 123; Street: 123 Main Street; Customer Name: 123Print Co.
      NrMatchedValues: 3

The search input "Customer 123" may produce the search terms "Customer" and "123." The selected application for this particular example is a generic application called Search. The Search application has no input parameters (NULL); however, other applications may receive parameters such as user preferences. Only one entity, namely Customer with a node ID of 65, was identified from the search input. The filter comprises the value "123" and is found in three Customer instance nodes with node IDs 3243, 5, and 143. The example includes the customer ID of each Customer instance, namely, Cust123, Cust456, and Cust789. The attribute/value pairs include: [Customer Number: 123] (i.e., the search term "123" was found in the Customer Number attribute of instance node 3243); [Street: 123 Main Street] (i.e., the search term "123" was found in the Street attribute of instance node 5); and [Customer Name: 123Print Co.] (i.e., the search term "123" was found in the Customer Name attribute of instance node 143).

Integrating the Knowledge Base in a Programming Framework

The discussion will now turn to a description of processing that takes place in accordance with the present disclosure when an identified application (e.g., block 910, FIG. 9) is invoked (e.g., block 912). The discussion begins with the building of the knowledge base 102 (FIG. 1), and in particular the building of knowledge graph 112.

Referring back to FIG. 1, in accordance with the present disclosure, node attributes, including attributes of entity nodes 402 (FIG. 4) and instance nodes 404, may be "tagged." As will be explained below, the notion of tagging an attribute provides a link between the knowledge base 102 and an application that is invoked to access the knowledge base.

In some embodiments, tagging may be based on predefined "application programming interface" (API) tags 20. API tags 20 may be used in the program code comprising applications 108, and in accordance with the present disclosure, API tags may also be used to direct which attributes in the knowledge graph 112 are tagged and what the attributes are tagged with.

API tags 20, thus, provide a linkage between references to API tags in the applications 108 and tagged attributes in the knowledge graph 112. In some embodiments, the API tags 20 may be predefined tags developed in conjunction with the initial knowledge graph 18, which representing a view of the enterprise data.

In accordance with the present disclosure, an application (e.g., 108) can be written by a developer independently of the knowledge base 102 and without having to know the specific database tables in the database system 116 used to store the data of the knowledge base. In fact, the database tables that comprise the knowledge base 102 are typically not available to the developer. Indeed, API tags 20 allow the developer to develop their application even before data is loaded into the knowledge base when the database tables have not yet been created.

The API tags 20 allow the program code comprising an application to "communicate" with or otherwise access data in the knowledge base 102. By decoupling the knowledge base 102 from applications that access the knowledge base, a high degree of flexibility is achieved in terms of the enterprise being able to maintain the knowledge base 102; already written applications can still work with the knowledge base as it evolves and changes in the enterprise. Conversely, developers of applications can write code using the API tags 20 to communicate with the knowledge base 102 irrespective of whether the knowledge base is already in place or just being built.

Referring now to FIG. 6, recall that the figure describes a high level logical description of a data loading operation performed by the knowledge builder 118 to build the knowledge base 102 in accordance with some embodiments of the present disclosure. At block 606 incoming data (e.g., enterprise data 12) may be classified to identify which class of data, or classes of data, the enterprise data belongs to, and by so doing identify one or more entity nodes in the knowledge graph 112 (e.g., 402 FIG. 4). Part of processing in block 606 includes mapping of columns of data in the incoming data, such as a data table, to properties (attributes) which may be stored in the property list 422 of an entity node that is identified with the incoming data.

As explained, node attributes may be tagged. Thus, in some embodiments, in block 606, in addition to mapping columns of data to attributes, knowledge builder 118 may tag the attributes based on the predefined API tags 20. For example, the knowledge builder 118 may determine if the attribute matches a predefined API tag, and if so, then the attribute may be tagged. In some embodiments, an attribute may be explicitly tagged, or the attribute itself may serve as a tag.

Suppose, for example, we have an entity node called Customer. The attributes of Customer may include a customer ID, a customer name, a customer phone number, and so on, which may be stored in the property list 422. One (or more) of the attributes may be designated as being "key attributes"; e.g., the customer ID may be a key attribute that uniquely identifies each customer. The entity node may include meta-data, for example, that designates the customer ID as a key attribute. The designation of an attribute as being a "key attribute" may serve a secondary purpose of tagging that attribute, which can then be referenced in an application. This aspect of the present disclosure will be explained in more detail below.

An attribute may be explicitly tagged. Consider, for example, the customer name attribute. In the customer entity node, for example, the customer name attribute may be represented by the attribute/value pair of attribute name (this may also be referred to as a "key")/data type+tag (the value); e.g., we might have key="Customer Name", value="String.Description" ('String' being a data type and 'Description' being an explicit tag. In an instance node of the customer entity node, the key/value pair for an actual customer may be key="Customer Name", value="XYZ Incorporated".

In accordance with the present disclosure, the property list 422 may include "private" attributes that relate to the entity node itself. For example, an entity node may include a set of private counters that are associated with each attribute. A counter may be incremented each time its associated attribute is accessed in a query. In accordance with the present disclosure, such private attributes may also be tagged and subsequently referenced in an application. Another example, is that users can flag certain attributes as being more (or less) important using a tag that indicates an importance level. For example, the UI may provide "like/dislike" button that will increment or decrement an "importance tag" that is associated with a particular attribute.

Figure 10:
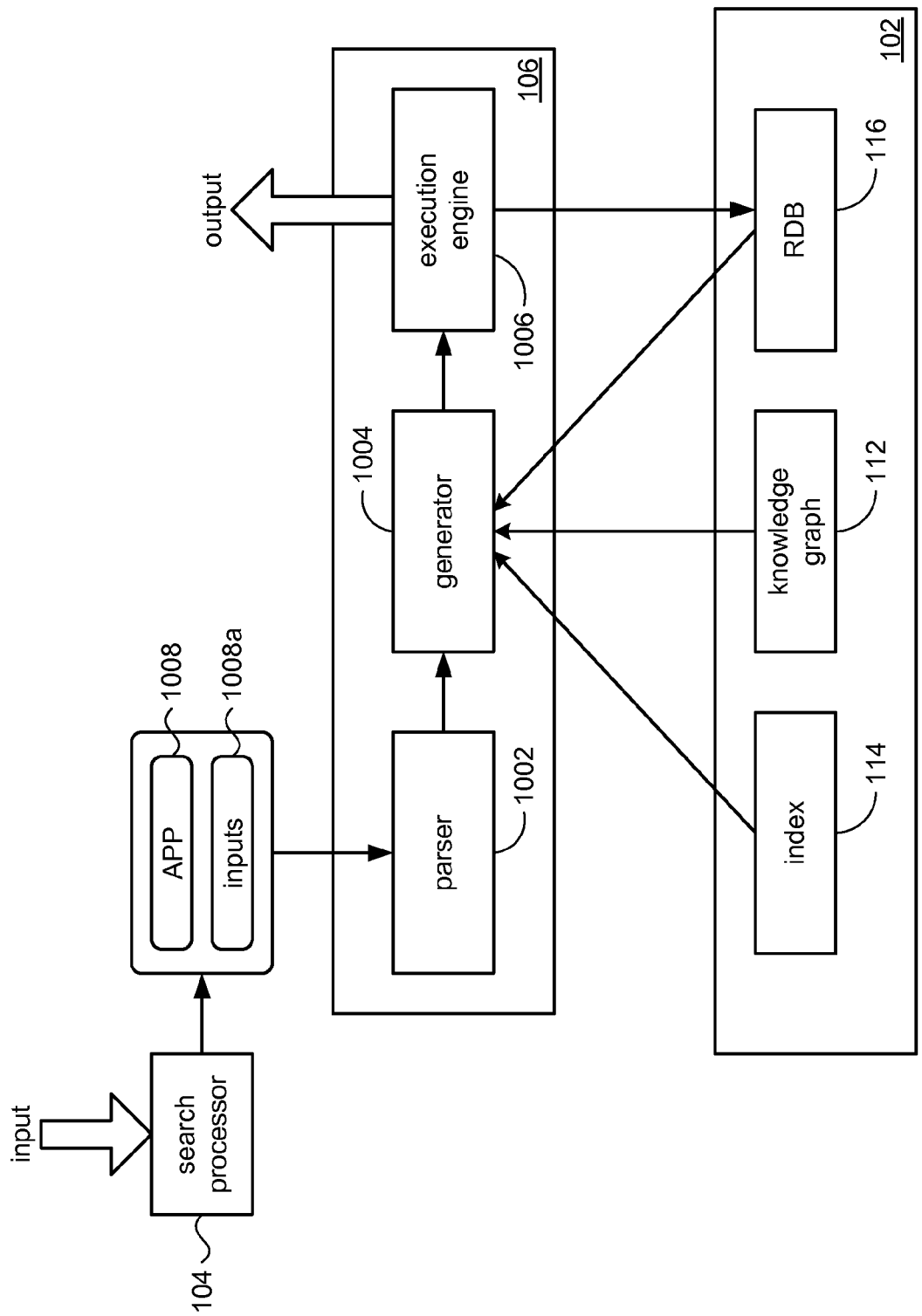
FIG. 10 shows a high level block diagram of the query engine.

Referring now to FIG. 10, a high level block diagram of the query engine 106 shown in FIG. 1 will be described. It will be appreciated, however, that in other embodiments, the details of the query engine 106 may differ. As explained above, a user's search input may be used to identify an application 1008 to process the search input, along with entity nodes and filters with which to invoke the application as inputs 1008a. The application 1008 and inputs 1008a may be processed by the query engine 106.

In some embodiments, the query engine 106 may include a parser 1002 to parse the program code that comprises the application 1008. A generator 1004 may produce references to the knowledge base 102 that correspond to API tags incorporated in the program code comprising the application 1008 and identified during the parsing. The generator 1004 may access the data structures of the knowledge base 102, including the knowledge graph 112, the index 114, and the database system 116 to resolve identified API tags into actual references to the data structures of the knowledge base. An execution engine 1006 may then execute the program code including the resolved API tags to produce an output. The execution engine 1006 may access the database system 116, for example, if an API tag resolves to an SQL query into the database system.

Figure 11:
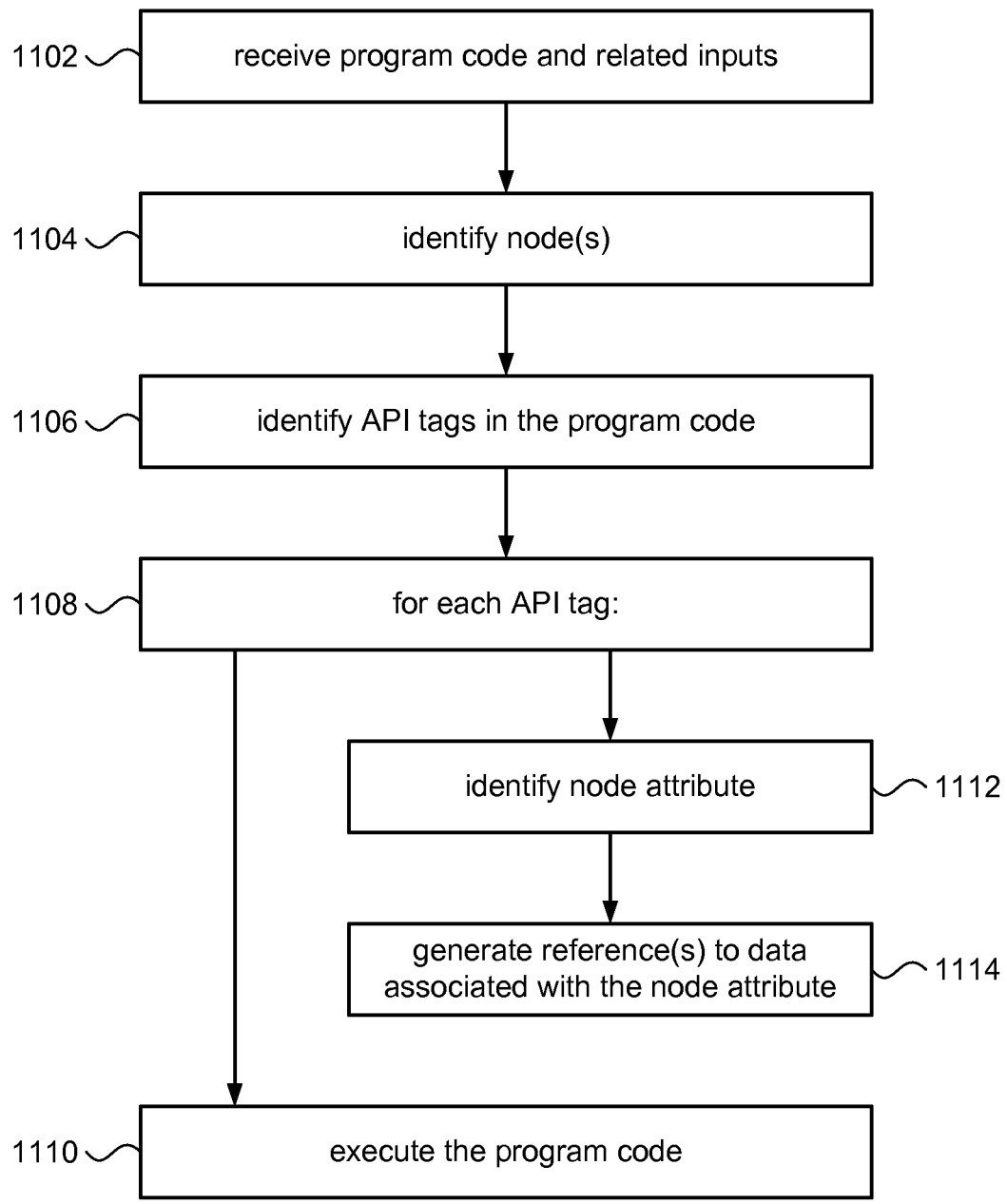
FIG. 11 shows a high level processing by the query engine.
Figure 12:
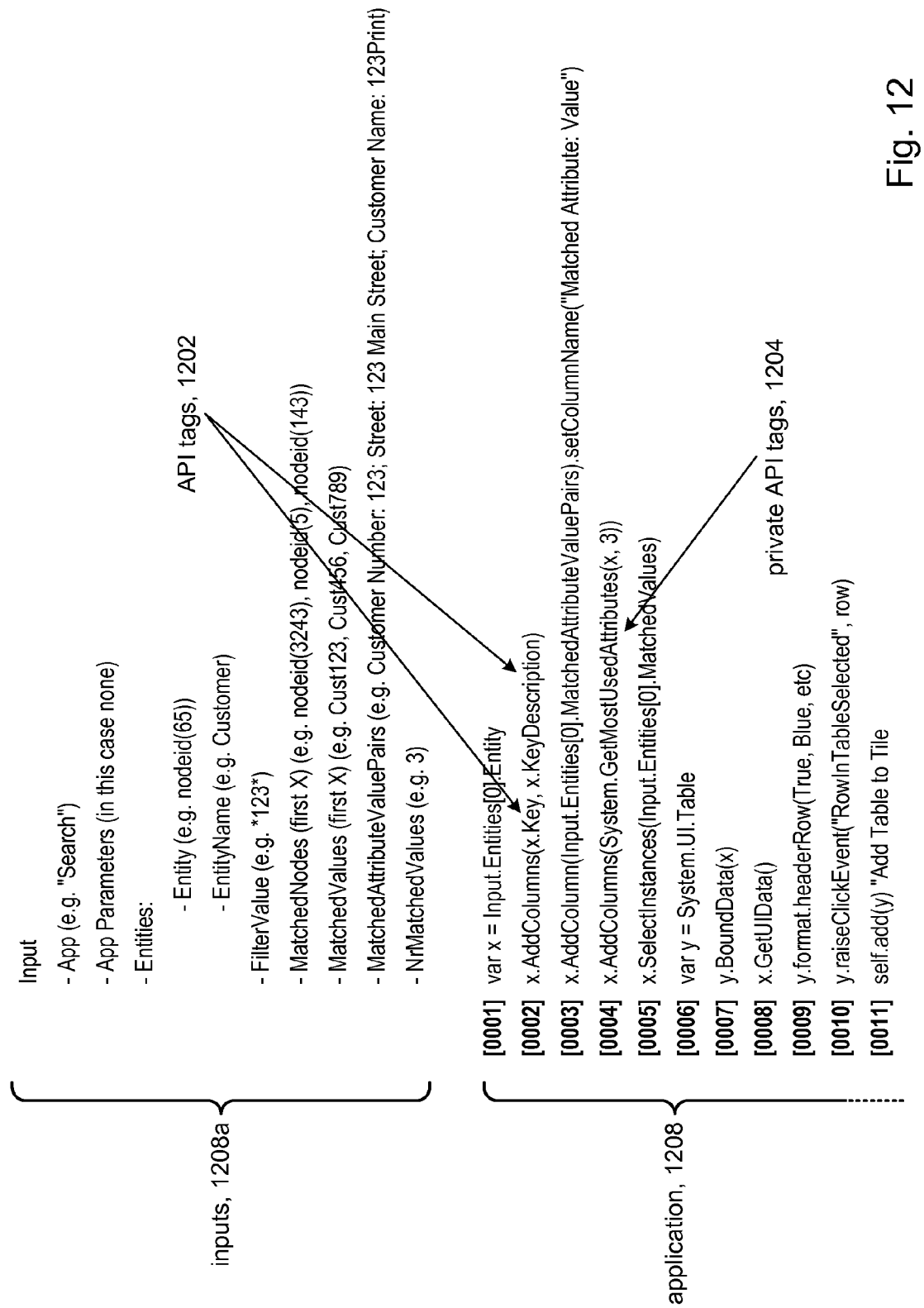
FIG. 12 shows processing by the query engine with an example.

Referring now to FIGS. 11 and 12, FIG. 11 shows a high level logical description of processing by the query engine 106 in accordance with some embodiments of the present disclosure. More specifically, the process flow will be explained in terms of the example embodiment of the query engine 106 disclosed herein. It will be appreciated that the specific algorithms and process flows will vary depending on particular embodiments of the query engine 106. FIG. 12 illustrates the processing with an example application 1208.

At block 1102, the parser 1002 may receive an application and inputs, such as entity node(s) and filter(s), that feed into the application. FIG. 12 shows an example of an application 1208 called Search that can result the search input "Customer 123," as described above in connection with FIG. 9. In the example shown in FIG. 12, the inputs 1208a to Search include an entity node having a node ID of 65 and an entity name of Customer and a filter value of 123. The inputs 1208a may further include information that identify node instances from the Customer entity that match the filter value, their customer IDs, matched attribute/value pairs, and so on.

At block 1104, the parser 1002 may resolve the program code at line 0001 using information in the inputs 1208a to assign the Customer entity node to the variable "x" so that subsequent references to "x" are also resolved. For example, at line 0002, the program code might read:

Customer.AddColumns(Customer.Key, Customer.KeyDescription).

At block 1106, the parser 1002 may parse the program code that comprises the application to identify one or more API tags in the program code. FIG. 12 illustrates examples of API tags 1202 (Key and KeyDescription) in program code comprising the application 1208.

At block 1108, the generator 1004 may resolve each of the identified API tags. Thus, at block 1112, an attribute in the node identified at block 1104 may be identified using the API tag. For example, the predefined API tags 20 in FIG. 1 may provide a mapping that the generator 1004 can use to map the identified API tag to an attribute in an entity node. Generator 1004 may do a string compare of the identified API tag with attribute names of the attributes in the entity node, and so on. Thus, for example, referring to the application 1208, the program code at line 0003 has a reference to an API tag "Key" and to another API tag "KeyDescription". Suppose the Customer node has the following attributes expressed as key/value pairs:

CustomerID/String.Description
IndustryCode/Numeric
Phone/Numeric
Email/Alphanumeric
CustomerLevel/Numeric
CustomerStatus/Alpha The generator 1004 may identify the attributes CustomerID and Description using the API tags Key and KeyDescription, respectively. In this particular example, the CustomerID may be designated a primary key, and thus may be identified as corresponding to the Key API tag. Its value may be tagged 'Description' and so the KeyDescription API tag will map to 'Description'.

At block 1114, the generator may replace the API tags (Key and KeyDescription) in the program code:

Customer.AddColumns(Customer.Key, Customer.KeyDescription).

with actual references to objects in the knowledge base 102; thus resolving the API tags:

Customer.AddColumns(Customer.CustomerID, Customer.Description).

It will be appreciated that resolving an API tag may produce other reference-able structures. For example, if the attribute references a column in a data table, the API tag may resolve into a database table reference.

FIG. 12 also illustrates an example of a "private" API tag 1204, which identifies or references an attribute in a node that characterizes the node itself. For example, the program code at line 0004 makes a system call from using the GetMostUsedAttributes method in a System object. The GetMostUsedAttributes method may access private attributes in the Customer node that keep a use count of each of its attributes. These private attributes may be tagged or somehow associates with the GetMostUsedAttributes method so that the logic comprising the method can return the N most used attributes of the Customer node.

After each API tag is resolved, then at block 1110 the program code, with its API tags resolved to reference-able objects, may then be executed. In some embodiments, the flow in FIG. 11 may be that a line of program code is resolved of any API tags and then executed. For example, this may line-by-line processing may occur in an interpreted environment. In other embodiments, the entire application may be resolve of its API tags and the entire resolved application may then be executed; e.g., interpreted or compiled into executable binary code.

In other embodiments, API tags can be used to retrieve information from the knowledge graph in addition to attributes. For instance, we can distinguish between measures (numeric data that can be summed up, etc.) and dimensions. The classification process during building of the knowledge base 102 may include detecting monetary currencies, units of measure, time-related attributes, and so on. Consequently, it is possible to retrieve, say, a measure of type "amount" by requesting an attribute of type measure which is associated with an attribute of type "currency". In this context, the term "associated" may mean that those two attributes 'amount' and 'currency' where next to each other when the data was classified during knowledge building; e.g., "$100". The classifier 306 may capture these relationships and store them in the knowledge graph.

Advantages and Technical Effect

A system in accordance with the present disclosure allows users in an organization to access the organization's data to do useful work with the data without having to rely on the organization's IT group to provide them with the proper reports and analytics. A user can pose queries and other search input and obtain results that are relevant to the semantics and context of the organization's data. The selection of a suitable application based on the user's search input to process the search input can produce meaningful output rather than generic and superfluous results that one might get using a generic search tool.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A computer-implemented method of decoupling an application from a knowledge base being accessed by the application, the computer-implemented method comprising:
receiving a user query to access a database;
using the user query to identify the application comprising a program code to be executed, wherein the application is written without having to know specifics of the database;
identifying one or more application programming interface (API) tags in the program code, wherein the API tags provide a link between the knowledge base and the application;
identifying at least one node from among a plurality of nodes comprising a graph;
for each identified API tag, resolving the identified API tag with a resolved data object by accessing the knowledge base, wherein resolving the identified API tag includes:
using the identified API tag to identify an attribute in the identified node; and
generating a reference to data that is associated with the identified attribute to produce a resolved data object; and
accessing the database by executing the program code, wherein resolved data objects are referenced during execution of the program code instead of the one or more API tags.

2. The computer-implemented method of claim 1 further comprising receiving a node identifier along with the application, wherein the identified node is identified based on the node identifier received with the application.

3. The computer-implemented method of claim 1 wherein the identified API tag comprises information that is associated with the identified attribute.

4. The computer-implemented method of claim 3 wherein the information comprising the identified API tag includes at least a portion of a name of the identified attribute.

5. The computer-implemented method of claim 1 wherein resolving the identified API tag with a resolved data object includes substituting the identified API tag in the program code with a reference to data object that is associated with the identified attribute.

6. The computer-implemented method of claim 1 further comprising identifying a data table associated with the identified node and substituting the identified API tag in the program code with a reference to the data table.

7. The computer-implemented method of claim 1 wherein the identified attribute is associated with a column in the data table and the identified API tag is substituted with a reference to the column in the data table.

8. The computer-implemented method of claim 1 wherein referencing the resolved data objects includes accessing one or more data tables associated with the identified node.

9. The computer-implemented method of claim 1 wherein the plurality of nodes comprises a plurality of first level nodes and a plurality of second level nodes, wherein the first level nodes represent classes of data and the second level nodes represent instances of the classes of data, wherein the identified node is either a first level node or a second level node.

10. A computer system comprising:
a computer processor; and
a data storage device having stored thereon computer program code which, when executed by the computer processor, causes the computer processor to decouple an application from a knowledge base being accessed by the application, wherein the computer processor operates to:
receive a user query to access a database;
use the user query to identify the application comprising program code to be executed, wherein the application is written without having to know specifics of the database;
identify one or more application programming interface (API) tags in the program code, wherein the API tags provide a link between the knowledge base and the application;
identify at least one node from among a plurality of nodes comprising a graph;
for each identified API tag, resolve the identified API tag with a resolved data object by accessing the knowledge base, wherein resolving the identified API tag includes:
using the identified API tag to identify an attribute in the identified node; and
generating a reference to data that is associated with the identified attribute to produce a resolved data object; and
access the database by executing the program code, wherein resolved data objects are referenced during execution of the program code instead of the one or more API tags.

11. The computer system of claim 10 wherein the computer program code, which, when executed by the computer processor, further causes the computer processor to receive a node identifier along with the application, wherein the identified node is identified based on the node identifier received with the application.

12. The computer system of claim 10 wherein the identified API tag comprises information that is associated with the identified attribute.

13. The computer system of claim 12 wherein the information comprising the identified API tag includes at least a portion of a name of the identified attribute.

14. The computer system of claim 10 wherein resolving the identified API tag with a resolved data object includes substituting the identified API tag in the program code with a reference to data object that is associated with the identified attribute.

15. The computer system of claim 10 wherein the identified attribute is associated with a column in the data table and the identified API tag is substituted with a reference to the column in the data table.

16. The computer system of claim 10 wherein referencing the resolved data objects includes accessing one or more data tables associated with the identified node.

17. A non-transitory computer readable storage medium having stored thereon program code, which, when executed by a computing device, cause the computing device to decouple an application from a knowledge base being accessed by the application, including:
receiving a user query to access a database;
using the user query to identify the application comprising a program code to be executed, wherein the application is written without having to know specifics of the database;
identifying one or more application programming interface (API) tags in the program code, wherein the API tags provide a link between the knowledge base and the application;
identifying at least one node from among a plurality of nodes comprising a graph;
for each identified API tag, resolving the identified API tag with a resolved data object by accessing the knowledge base, wherein resolving the identified API tag includes:
using the identified API tag to identify an attribute in the identified node; and
generating a reference to data that is associated with the identified attribute to produce a resolved data object; and
accessing the database by executing the program code, wherein resolved data objects are referenced during execution of the program code instead of the one or more API tags.

18. The non-transitory computer readable storage medium of claim 17 wherein the program code, which, when executed by a computing device, cause the computing device to receive a node identifier along with the application, wherein the identified node is identified based on the node identifier received with the application.

19. The non-transitory computer readable storage medium of claim 17 wherein the identified API tag comprises information that includes at least a portion of a name of the identified attribute.

20. The non-transitory computer readable storage medium of claim 17 wherein the identified attribute is associated with a column in the data table and the identified API tag is substituted with a reference to the column in the data table.

* * * * *